(12) United States Patent
Boone et al.

(10) Patent No.: US 10,477,022 B2
(45) Date of Patent: Nov. 12, 2019

(54) AUTOMATED TELEPHONE HOST SYSTEM INTERACTION

(71) Applicant: REPNOW INC., San Diego, CA (US)

(72) Inventors: Alexander Boone, San Diego, CA (US); Stanfell Boone, Thousand Oaks, CA (US); Fredrick Korfin, San Diego, CA (US)

(73) Assignee: REPNOW INC., San Diego, CA (US)

( * ) Notice: Subject to any disclaimer, the term of this patent is extended or adjusted under 35 U.S.C. 154(b) by 0 days.

(21) Appl. No.: 15/821,579

(22) Filed: Nov. 22, 2017

(65) Prior Publication Data

US 2019/0158668 A1   May 23, 2019

(51) Int. Cl.
| | | |
|---|---|---|
| *H04M 3/00* | (2006.01) | |
| *H04M 3/51* | (2006.01) | |
| *H04M 3/523* | (2006.01) | |
| *H04M 3/493* | (2006.01) | |

(52) U.S. Cl.
CPC ....... *H04M 3/5183* (2013.01); *H04M 3/4935* (2013.01); *H04M 3/5231* (2013.01); *H04M 3/493* (2013.01)

(58) Field of Classification Search
CPC ............................ H04M 3/5183; H04M 3/493
USPC ....... 379/266.01–266.1, 265.01–265.14, 309
See application file for complete search history.

(56) References Cited

U.S. PATENT DOCUMENTS

| | | | |
|---|---|---|---|
| 5,602,742 A * | 2/1997 | Solondz | G07B 17/00024 705/403 |
| 6,259,786 B1 | 7/2001 | Gisby | |
| 6,522,894 B1 | 2/2003 | Schmidt | |
| 6,771,746 B2 | 8/2004 | Shambaugh | |
| 6,847,715 B1 | 1/2005 | Swartz | |
| 6,850,602 B1 | 2/2005 | Chou | |
| 6,885,733 B2 | 4/2005 | Pearson | |
| 6,885,737 B1 | 4/2005 | Gee | |

(Continued)

FOREIGN PATENT DOCUMENTS

| | | |
|---|---|---|
| EP | 1461973 B1 | 9/2009 |
| EP | 2297934 B1 | 3/2011 |

(Continued)

OTHER PUBLICATIONS

International Search Report and Written Opinion for corresponding PCT Application No. U.S. 2017/063134, dated Aug. 17, 2018, in 15 pages.

*Primary Examiner* — William J Deane, Jr.
(74) *Attorney, Agent, or Firm* — Knobbe Martens Olson & Bear LLP

(57) ABSTRACT

Systems and methods for automated telephone host system interaction. A system can include one or more client applications executable by respective communication devices and a server in communication with the respective communication devices. The system can store user information for a user and receive, from the user, requests associated with a service provider. Responsive to the requests, the system can cause initiation of a call center call to a call center associated with the service provider, automatically navigate a call handling system of the call center, monitor a held call center call, and detect when a live agent answers the call. Responsive to detecting the live agent, the system can initiate a call to the user device and bridge the calls such that the user can speak to the live agent.

30 Claims, 15 Drawing Sheets

(56) References Cited

U.S. PATENT DOCUMENTS

| | | |
|---|---|---|
| 6,914,962 B2 | 7/2005 | Neary |
| 7,050,568 B2 | 5/2006 | Brown |
| 7,068,775 B1 | 6/2006 | Lee |
| 7,245,711 B2 | 7/2007 | Margolis |
| 7,260,537 B2 | 8/2007 | Creamer |
| 7,317,789 B2 | 1/2008 | Comerford |
| 7,349,534 B2 | 3/2008 | Joseph |
| 7,471,787 B2 | 12/2008 | Chambers |
| 7,653,549 B2 | 1/2010 | Knott |
| 7,689,426 B2 | 3/2010 | Matula |
| 7,752,080 B1 * | 7/2010 | Greener ............... G06Q 10/10 705/26.1 |
| 7,933,581 B2 | 4/2011 | Wijayanathan |
| 7,936,868 B2 | 5/2011 | Fitzgerald |
| 8,027,457 B1 | 9/2011 | Coy |
| 8,027,459 B2 | 9/2011 | Lee |
| 8,102,991 B2 | 1/2012 | Shaffer |
| 8,150,023 B2 | 4/2012 | Williams |
| 8,184,617 B2 | 5/2012 | SjöGren |
| 8,238,540 B1 | 8/2012 | Duva |
| 8,270,580 B2 | 9/2012 | Surendran |
| 8,345,835 B1 | 1/2013 | Or-bach |
| 8,363,818 B2 | 1/2013 | Gupta |
| 8,457,963 B2 | 6/2013 | Charriere |
| 8,467,765 B2 | 6/2013 | Islam |
| 8,543,406 B2 | 9/2013 | Wu |
| 8,571,203 B2 | 10/2013 | Knott |
| 8,589,167 B2 | 11/2013 | Baughman |
| 8,693,671 B2 | 4/2014 | Fried |
| 8,699,697 B2 | 4/2014 | Vasquez |
| 8,717,915 B2 | 5/2014 | Dubut |
| 8,731,148 B1 | 5/2014 | Lavian |
| 8,737,597 B2 | 5/2014 | Shah |
| 8,750,487 B2 | 6/2014 | Singh |
| 8,767,948 B1 | 7/2014 | Akbar |
| 8,787,556 B1 | 7/2014 | Cantu, II |
| 8,879,703 B1 | 11/2014 | Lavian |
| 8,934,618 B2 | 1/2015 | Costello |
| 8,958,532 B2 | 2/2015 | Kritt |
| 9,100,478 B1 | 8/2015 | Benway |
| 9,178,997 B2 | 11/2015 | Oristian |
| 9,219,819 B1 | 12/2015 | Glass |
| 9,380,159 B2 | 6/2016 | Iltus |
| 9,398,130 B2 * | 7/2016 | Tung ..................... H04M 1/605 |
| 9,401,992 B2 | 7/2016 | Srinivas |
| 9,420,097 B2 | 8/2016 | Perotti |
| 9,426,294 B1 | 8/2016 | Lillard |
| 9,438,729 B2 | 9/2016 | Natesan |
| 9,473,628 B2 | 10/2016 | Marimuthu |
| 9,485,360 B2 | 11/2016 | Tolksdorf |
| 9,538,005 B1 | 1/2017 | Nguyen |
| 9,542,074 B2 | 1/2017 | Mauro |
| 9,560,197 B2 | 1/2017 | Iltus |
| 9,571,639 B2 | 2/2017 | Gabbai |
| 9,583,108 B2 | 2/2017 | Baker, IV |
| 9,668,112 B2 | 5/2017 | Figa |
| 9,679,584 B1 | 6/2017 | Smith |
| 9,794,390 B2 | 10/2017 | Bi |
| 9,794,406 B2 | 10/2017 | Li |
| 9,807,240 B1 | 10/2017 | Varman |
| 2003/0086444 A1 | 5/2003 | Randmaa |
| 2003/0086541 A1 | 5/2003 | Brown |
| 2007/0088701 A1 | 4/2007 | Rao |
| 2007/0121882 A1* | 5/2007 | Timmins ............. H04M 3/4931 379/218.01 |
| 2007/0168472 A1* | 7/2007 | Walter ................ H04M 1/2471 709/220 |
| 2008/0144792 A1 | 6/2008 | Lavoie |
| 2009/0136014 A1 | 5/2009 | Bigue |
| 2009/0161858 A1 | 6/2009 | Goss |
| 2009/0245487 A1 | 10/2009 | Jockusch |
| 2009/0245500 A1* | 10/2009 | Wampler .......... H04M 3/42382 379/265.09 |
| 2010/0080150 A1 | 4/2010 | Steiner |
| 2010/0091960 A1 | 4/2010 | Ervin |
| 2010/0091970 A1* | 4/2010 | Cheung ............. H04M 3/42374 379/207.07 |
| 2010/0150323 A1 | 6/2010 | Grattan |
| 2010/0162101 A1* | 6/2010 | Anisimov ........... H04M 3/5183 715/239 |
| 2011/0170673 A1 | 7/2011 | Dutta |
| 2011/0230196 A1* | 9/2011 | Tal .................... H04M 3/42374 455/450 |
| 2013/0223434 A1 | 8/2013 | Bateman |
| 2013/0223600 A1 | 8/2013 | Sharp |
| 2014/0119531 A1 | 5/2014 | Tuchman |
| 2014/0279718 A1 | 9/2014 | Southey |
| 2014/0321632 A1* | 10/2014 | Di Fabbrizio .......... H04M 3/48 379/207.04 |
| 2014/0334612 A1 | 11/2014 | Singer |
| 2015/0030143 A1 | 1/2015 | Bhogal |
| 2015/0222755 A1* | 8/2015 | Chintala ............. H04M 1/6033 455/416 |
| 2015/0350427 A1 | 12/2015 | Benway |
| 2016/0021247 A1 | 1/2016 | Marimuthu |
| 2016/0028889 A1* | 1/2016 | Mittal ................... H04M 3/493 379/265.09 |
| 2016/0065739 A1 | 3/2016 | Brimshan |
| 2016/0119474 A1 | 4/2016 | Malik |
| 2016/0198045 A1 | 7/2016 | Kulkarni |
| 2016/0261743 A1 | 9/2016 | Grodek |
| 2016/0344870 A1 | 11/2016 | Nair |
| 2016/0370952 A1 | 12/2016 | Karnewar |
| 2017/0078922 A1* | 3/2017 | Raleigh ................ H04W 28/10 |
| 2017/0099385 A1* | 4/2017 | Nguyen ................. H04W 4/02 |
| 2017/0109757 A1* | 4/2017 | Tuchman ............. H04L 63/104 |
| 2017/0155768 A1 | 6/2017 | Conway |
| 2017/0162200 A1 | 6/2017 | Quibria |
| 2017/0163804 A1 | 6/2017 | Bouzid |
| 2017/0215073 A1* | 7/2017 | Raleigh ............ G06Q 10/06375 |
| 2017/0353594 A1 | 12/2017 | Rajapandiyan |
| 2018/0054524 A1 | 2/2018 | Dahan |
| 2018/0097940 A1* | 4/2018 | Beilis ................. G06F 17/27 |

FOREIGN PATENT DOCUMENTS

| | | |
|---|---|---|
| WO | WO 2008/002705 A2 | 1/2008 |
| WO | WO 2009/012689 A1 | 1/2009 |
| WO | WO 2009/111432 A2 | 9/2009 |
| WO | WO 2012/172416 A1 | 12/2012 |
| WO | WO 2013/147718 A2 | 10/2013 |

* cited by examiner

AUTOMATED TELEPHONE HOST SYSTEM INTERACTION

BACKGROUND

Interacting with telephone host systems may be tedious and complicated. A user attempting to reach a customer service representative to resolve a question or concern may be required to identify an appropriate telephone number to call, navigate a time-consuming interactive voice response or other automated host system, and wait on hold until a live agent is available to answer the user's call. If the user is disconnected or unable to wait for a live agent, the user may need to repeat the process multiple times to speak to a live agent. The process of phone communication through selecting menu options may be wasteful for a user's time, as the user must wait for the options to be spoken. Although there may be a variety of ways for a user to reach a company to resolve an issue, email or telephone are typically the most frequent ways to make contact, and phone calls are often the most preferred channel for general inquiries.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, a system comprises one or more client applications executable by respective communication devices, each communication device comprising one or more processors configured with processor-executable instructions included in the client application to perform operations comprising storing, by a communication device, user information for a user, wherein the user information includes generic user information and provider specific user information; receiving, from the user of the communication device, a request associated with a service provider; determining that the request is associated with at least one of the generic user information and the provider specific user information; and transmitting request information including the generic user information and the provider specific user information via a network. The system further comprises a server comprising one or more processors configured with processor-executable instructions to perform operations comprising receiving, via the network, the request information from the communication device; causing, based at least in part on the request information, initiation of a call center call from a telephony service to a call center corresponding to the request; determining that a live agent has answered the call center call; responsive to determining that the live agent has answered the call center call, causing initiation of a user call from the telephony service to the communication device; and causing the telephony service to bridge the user call and the call center call such that audio can be transmitted between the communication device and the call center.

In another embodiment, a system comprises one or more client applications executable by respective communication devices, each communication device comprising one or more processors configured with processor-executable instructions included in the client application to perform operations comprising receiving, from a user of the communication device, a natural language input; determining, using natural language processing, that the natural language input comprises a request associated with a service provider; and transmitting a representation of the natural language input via a network. The system further comprises a server comprising one or more processors configured with processor-executable instructions to perform operations comprising receiving, via the network, the representation of the natural language input from the communication device; determining, using natural language processing, a phone number of a call center associated corresponding to the request; causing, based at least in part on the request information, initiation of a call center call from a telephony service to the call center; receiving at least one interactive voice response (IVR) prompt transmitted by the call center in the call center call; determining, based on natural language processing of the representation of the natural language input, a response to the IVR prompt; and causing the response to be transmitted from the telephony service to the call center in response to the IVR prompt.

In another embodiment, a system comprises a client application executable by a communication device alternatively operable for calling in a handset mode and a speaker mode, the client application configured to receive, from a user of the communication device, requests associated with a service provider and transmit request information associated with the request via a network. The system further comprises a server comprising one or more processors configured with processor-executable instructions to perform operations comprising receiving, via the network, the request information from the one or more communication devices; causing, based at least in part on the request information, initiation of a call center call from a telephony service to a call center corresponding to the request; and responsive to determining that a live agent has answered the call center call, causing initiation of a user call from the telephony service, the user call bridged with the call center call such that audio can be transmitted between the communication device and the call center. The communication device is further configured to detect that an incoming call is the user call and automatically answer the user call in the speaker mode such that the communication device plays audio transmissions from the call center at a first volume.

In another embodiment, a system comprises one or more client applications executable by respective communication devices, each communication device configured to receive, from a user of the client computing device, a request for a customer service call, and transmit request information associated with the request via a network. The system further comprises a server comprising one or more processors configured with processor-executable instructions to perform operations comprising causing a telephony service to initiate a first pre-queued call center call to a call center associated with a service provider; receiving, from the one or more client communication devices, the request information; determining that a live agent has answered the first pre-queued call center call; determining, based on the received request information, that the service provider corresponds to a pending request for a customer service call; causing initiation of a user call from the telephony service to the communication device associated with the pending request; and causing the telephony service to bridge the user call and the first pre-queued call center call such that audio can be transmitted between the communication device and the call center.

In another embodiment, a computer-implemented method comprises, under control of one or more processors, detecting an end of an interaction between a user of a communication device and a live agent at a call center associated with a service provider, wherein the call is associated with a post-call interactive voice response (IVR) survey comprising an IVR prompt; causing, at least in part, transmission to the client communication device of a visual representation of the IVR prompt; causing, at least in part, the IVR prompt to be displayed on a display of the client communication device; receiving, from the client communication device, a response to the IVR prompt; and transmitting the response to the call center.

In another embodiment, a computer-implemented method comprises, under control of one or more processors, under control of one or more processors, receiving, from a communication device, request information associated with a request from a user of the communication device, the request associated with a service provider; causing, based at least in part on the request information, initiation of a call center call from a telephony service to a call center corresponding to the request; determining that a live agent has answered the call based at least in part on audio data received from the call center; responsive to determining that the live agent has answered the call center call, causing initiation of a user call from the telephony service to the communication device; causing the telephony service to bridge the user call and the call center call such that audio can be transmitted between the communication device and the call center; detecting that at least one of the user call and the call center call has been disconnected; and responsive to the detecting, causing the telephony service to bridge the non-disconnected one of the user call and the call center call with a second call such that audio can be transmitted between the communication device and the call center.

In another embodiment, a computer-implemented method comprises, under control of one or more processors, receiving, from a communication device, request information associated with a request from a user of the communication device, the request associated with a service provider; causing, based at least in part on the request information, initiation of a call center call from a telephony service to a call center corresponding to the request; determining that a live agent has answered the call center call based at least in part on audio data received from the call center; responsive to determining that the live agent has answered the call center call, transmitting a proxy message to the live agent via the call center call; causing initiation of a user call from the telephony service to the communication device; and causing the telephony service to bridge the user call and the call center call such that audio can be transmitted between the communication device and the call center.

In another embodiment, a computer-implemented method comprises, under control of one or more processors, receiving, from a communication device, request information associated with a request from a user of the communication device, the request associated with a service provider; causing, based at least in part on the request information, initiation of a call center call from a telephony service to a call center corresponding to the request; determining that a live agent has answered the call based at least in part on audio data received from the call center; responsive to determining that the live agent has answered the call center call, causing initiation of a user call from the telephony service to the communication device; causing the telephony service to bridge the user call and the call center call such that audio can be transmitted between the communication device and the call center; detecting, subsequent to causing the telephony service to bridge the user call and the call center call, that the user has been placed on a hold based at least in part on at least one of a user input at the communication device and audio data received from the call center; and sending a control message to cause a suspension of audio transmissions to the communication device in response to detecting that the user has been placed on a hold.

In another embodiment, a computer-implemented method comprises, under control of one or more processors, receiving, at a communication device, a request from a user of the communication device, the request associated with a service provider; causing, based at least in part on the request, initiation of a call center call from a telephony service to a call center corresponding to the request; determining that a live agent has answered the call based at least in part on audio data received from the call center; responsive to determining that the live agent has answered the call center call, causing initiation of a user call from the telephony service to the communication device; and causing the telephony service to bridge the user call and the call center call such that audio can be transmitted between the communication device and the call center.

In another embodiment, a computer-implemented method comprises, under control of one or more processors, receiving, from a communication device, request information associated with a request from a user of the communication device, the request associated with a service provider; causing, based at least in part on the request information, initiation of a call center call from a telephony service to a call center corresponding to the request; receiving an audio transmission from the call center while the call center call is on hold at the call center; determining, based on natural language processing, that the audio transmission identifies a networked resource associated with the request; and causing, at least in part, an application being executed on the communication device to present at least a portion of the networked resource.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
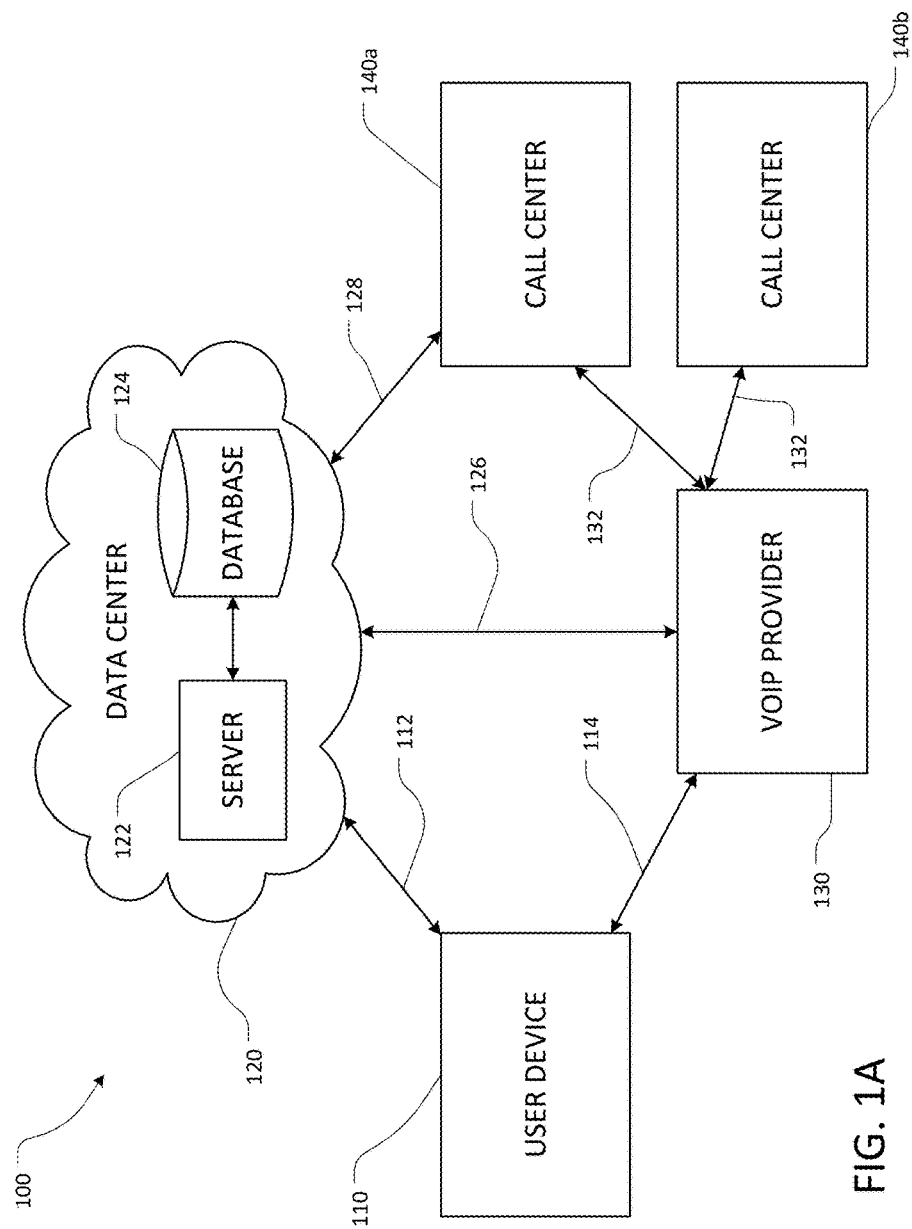
FIG. 1A is a block diagram showing an example communication system for automated telephone host system interaction.

Generally described, the systems and methods described herein provide enhanced interaction between users and call centers. In some embodiments, a user's interaction with a call center may be reduced and/or simplified by routing calls from a user device to a call center through a voice over IP (VoIP) provider or other telephony service which is at least partially controlled by an automated data center in conjunction with a service provider application executing on the user device.

In one example implementation, the application is an application on a mobile phone. The application is capable of receiving and interpreting requests from a user to be connected to an agent at a desired entity. For example, the user may request, via the mobile phone, to speak to an agent at the user's wireless carrier regarding a problem with a bill, an agent at an airline to make a change to a reservation, an agent at a utility company to report a problem, etc. The application can transfer the request to the automated data center associated with the application. Subsequently, various systems and call flows described herein allow for navigation of an automated telephone system at a call center associated with the desired entity and monitoring of call holding, until a live agent at the call center answers the call. When the live agent answers the call, the user can be notified via an outbound call placed to the mobile phone or other specified communication device. When the call is accepted by the user or via the specified communication device, the user is able to communicate directly with the live agent without having to manually navigate an automatic call distribution (ACD) system or interactive voice response (IVR) system or wait on hold.

In some embodiments, the system may use natural language processing to direct a call to the appropriate call center based on a conversational request from the user. In further embodiments, the system may utilize an automatic speaker mode to alert or immediately connect the user to a live agent that is on the line pursuant to their request. Additionally, a user proxy message may be played to the live agent while the user is notified so as to prevent the live agent from hanging up if there is a delay accepting the call in response to the notification. If the user is placed on a secondary hold after being connected to a live agent, the user device can be disconnected from the call while the system remains on the line that is on hold, and the user can be called back when the live agent returns. In further embodiments, the automated data center may implement a pre-queuing process, such that calls to commonly used call centers may be initiated and queued before a user request has occurred. When a user requests a call to the pre-queued call center, the call can immediately be connected to a waiting call with a live agent for expedited service. In addition, certain embodiments may allow automated in-call surveys to be administered through a user interface on the communication device after the call is terminated to enhance user participation and efficiency of call center surveys with both affiliated and unaffiliated call centers, as the system would be able to translate the user interface answers with the required device interface.

In some embodiments, multi-channel processing may allow the system to use the user's input data alone or in combination with the call center organization's data to help a user resolve their request during the time that the call center call is being navigated and/or held. For example, the call center organization's data may include data regarding self-help for the user, such as information on frequently asked questions and/or forums, and can include an immediate connection with quicker or more readily available customer service options of the service provider, such as chat bots, live chat, or the like, to assist the user in possibly resolving their request while the call center call is still being placed. The call center organization's data may be retrieved, for example, by determining, using natural language processing, a URL or other resource locator provided by the call center in a recorded hold message while the call center call is on hold. In some embodiments, this can improve efficiency for both the user and the call center, as some issues may be resolvable while the user waits for the call with the live agent, and the call may be ended before the live agent is connected, allowing the live agent to assist another caller. Multi-channel processing may further be efficient as information collected through the self-help channel may be provided to the live agent or call handling system to decrease the time required to resolve the user's issue.

FIG. 1A schematically depicts an example communication system 100 configured for call handling functionality in accordance with various embodiments described herein. The system 100 generally includes a user device 110, a data center 120, and a VoIP provider 130 operable to interact with one or more call centers 140a, 140b. The data center 120 includes at least one server 122 and at least one database 124.

Non-limiting examples of the user device 110 include a personal computing device, laptop computing device, hand held computing device, mobile device (e.g., mobile phones or tablet computing devices), wearable device configured with network access and program execution capabilities (e.g., "smart eyewear" or "smart watches"), wireless device, electronic reader, or some other portable electronic communication device or appliance. The user device 110 is configured for wired and/or wireless communications. In some embodiments, the user device 110 is a smartphone or other computing device which may be configured to communicate over both public switched telephone network (PSTN) connections and wireless data connections. The user device 110 can include one or more applications executing on a processor of the user device 110 and operable to interact with the data center 120 and the VoIP provider 130. The user device 110 is in communication with the data center 120 via a data connection 112. The user device 110 is in communication with the VoIP provider 130 via a PSTN connection 114. Although certain connections are described herein as PSTN connections, it will be appreciated that any of the PSTN connections described may be implemented as VoIP or other data connections in addition to or instead of PSTN for communicating calls to or from a user device, without departing from the scope of the present disclosure.

The data center 120 can include one or more computing devices including processors and memory. The data center 120 includes one or more servers 122 and one or more data stores, such as the database 124. In some embodiments, the data center 120 can be a cloud-based and/or distributed network of computing devices. The computing devices of the data center 120 are configured for wired and/or wireless communications. The data center 120 is in communication with the user device 110 via the data connection 112. The data center 120 is in communication with the VoIP provider via a data connection 126. In some embodiments, the data center 120 can be configured to communicate directly with an affiliated call center 140*a* via a data connection. The data center 120 can be independent of an unaffiliated call center 140*b*. The data center 120 can be further configured to communicate over a PSTN connection. One or more software processes executing at the data center 120 are configured to receive and process data transmitted from the user device 110 and to transmit data to the applications executing on the user device 110. Software processes executing at the data center 120 are further configured to interact with the VoIP provider 130, for example, by causing the VoIP provider 130 to initiate call center calls to a call center 140*a*, 140*b* or user calls to the user device 110, and/or by causing the VoIP provider 130 to bridge an existing user call with an existing call center call, for example, by sending a control message or other communication to the VoIP provider.

The VoIP provider 130 is a service operable to provide voice over Internet protocol (VoIP) communications. The VoIP provider 130 can be a third-party service provider or can be a component of the data center 120. The VoIP provider 130 is configured to interact with the user device 110 via the PSTN connection 114 and to interact with the data center 120 via the data connection 126. The VoIP is further configured to interact with a call center 140*a*, 140*b* via a PSTN connection 132. The VoIP provider is configured to receive user calls from the user device 110 and to initiate calls to the user device 110. The VoIP provider 130 is further configured to initiate call center calls to a call center 140*a*, 140*b*. When at least one user call and at least one call center call are active, the VoIP provider 130 can bridge a user call to a call center call such that a user of the user device 110 can interact with a call center 140*a*, 140*b* over a VoIP connection. Initiation and bridging of calls at the VoIP provider 130 can be performed responsive to one or more signals received from the data center 120 over the data connection 126. For example, the VoIP provider 130 and data center 120 may communicate using one or more standardized or proprietary protocols such as Session Initiation Protocol (SIP) or Media Gateway Control Protocol (MGCP). Once a communications channel is established, additional protocols may be used to transport the data (e.g., audio, images, video, etc.) during the call session such as real-time transport protocol (RTP) or secure real-time transport protocol (SRTP). Details of exemplary systems and methods for VoIP are described in "Internet Communications Using SIP" by Henry Sinnreich and Alan B. Johnston (Wiley 2ed Jul. 31, 2006) which is hereby incorporated by reference.

The call centers 140*a*, 140*b* can be any telephone host system configured to receive phone calls over a PSTN connection. The call centers 140*a*, 140*b* can be affiliated with one or more third parties (e.g., merchants, product manufacturers, service providers, government entities, utilities, etc.). The call centers 140*a*, 140*b* can include any type of automated call handling system. Non-limiting examples of call handling systems used by the call centers 140*a*, 140*b* include interactive voice response (IVR), automated attendant, voice response unit (VRU), automatic call distributor (ACD), or other computer telephony integration (CTI) or computer-supported telecommunications applications (CSTA). In some aspects, an affiliated call center 140*a* can be configured to connect directly or indirectly to the data center 120 via the data connection 128. For example, an affiliated call center 140*a* can be operated by a third party having an existing agreement with the operator of the system 100, such as for enhanced survey or call queuing functionality. Thus, a user of the user device 110 may be able to interact with the call center through the VoIP provider 130 and through the data center 120. In some aspects, an unaffiliated call center 140*b* is not configured to interact with the data center 120. For example, an unaffiliated call center 140*b* may be any call center associated with an organization that has not established a relationship with the operator of the system 100. Thus, for the various unaffiliated call centers 140*b*, the system 100 interacts with the call center 140*b* through a PSTN connection 132 to the VoIP provider 130. The data center 120 and the VoIP provider 130 can be configured to connect the user device 110 to any number of publicly accessible call centers 140*a*, 140*b*.

Figure 1B:
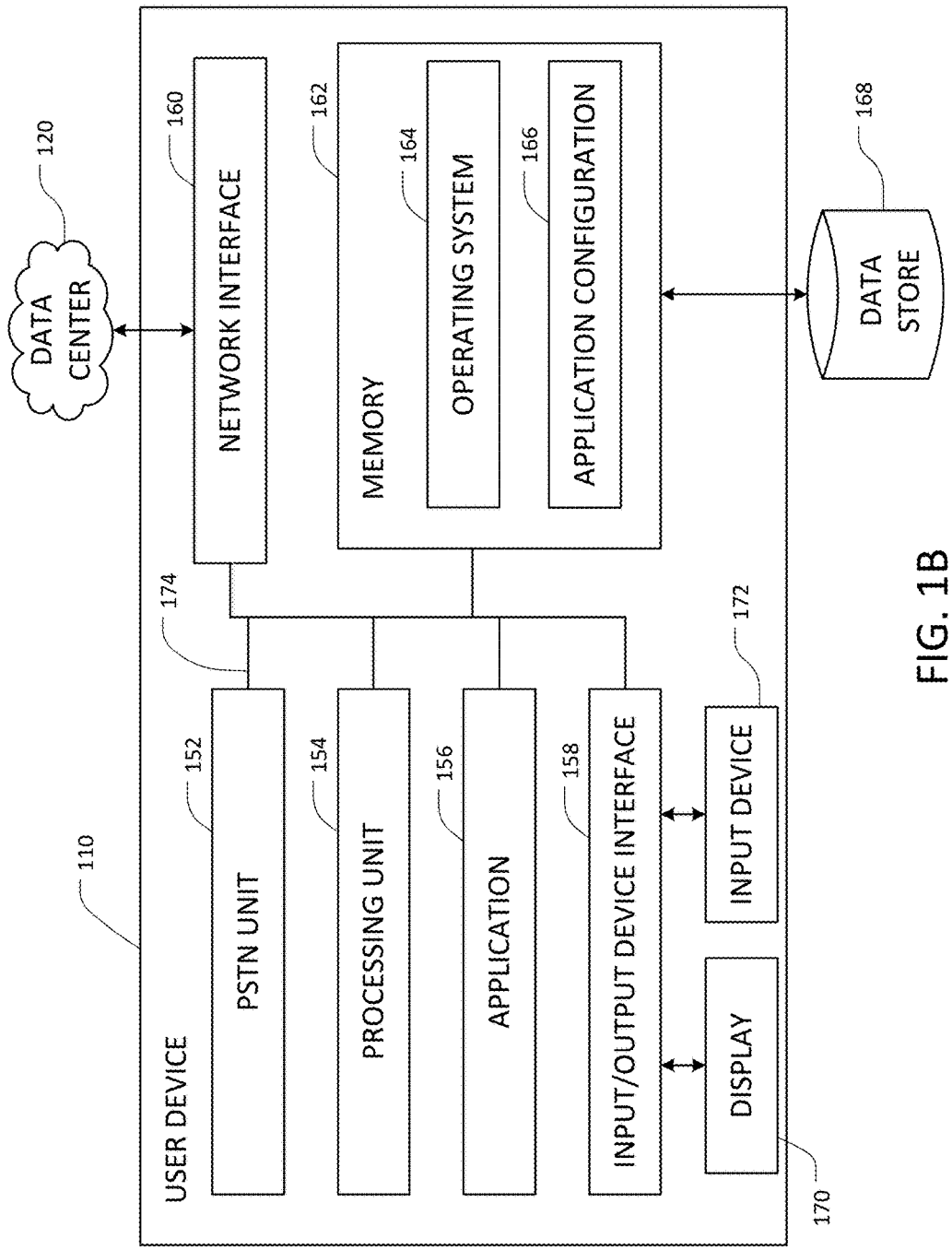
FIG. 1B is a block diagram of an illustrative user device that may implement one or more of the telephone host system interaction features described.

FIG. 1B is a block diagram of an illustrative user device that may implement one or more of the telephone host system interaction features described. For example, the user device 110 may be configured to function as the user device 110 depicted in FIG. 1A. The user device 110 can be a smartphone, tablet, hand held computing device, portable computing device, or other computing device. The user device 110 may include a PSTN unit 152, a processing unit 154, an application 156, an input/output device (I/O) interface, a network interface 160, and a memory 162. The memory 162 may include an operating system 164 and an application configuration 166 associated with the application 156. The input/output device interface 158 is configured to interact with a display 170 or other output device (e.g., a microphone) and an input device 172. The memory 162 may further be in communication with an external data store 168. The network interface 160 can be configured to communicate with the data center 120 as depicted in FIG. 1A.

The PSTN unit 152 can provide connectivity to a PSTN network for phone call functionality. For example, the PSTN unit 152 can enable the user device 110 to connect to the VoIP provider 130 described above with reference to FIG. 1A. In some implementations, the connection to the PSTN network through the PSTN unit 152 may be via a cellular communications network (e.g., long term evolution (LTE) networks, global system for mobile communications (GSM) networks, code-division multiplex access (CDMA) networks, or the like) or a satellite communications network (e.g., broadband global area network (BGAN) or the like). In such instances, the communications network may provide access to the PSTN through a gateway. In some embodiments, the device may or may not include a PSTN unit 152 or other capability to connect with PSTN, and may conduct some or all calling functionality using VoIP, rather than PSTN calling.

The processing unit 154 can receive information and instructions from other computing systems or services via the network interface 160. The network interface 160 can also store data directly to the memory 162. The processing unit 154 can communicate to and from the memory 162 and output information to a display 170 via the input/output device interface 158. The input/output device interface 158 can also accept input from the input device 172, such as a touch screen, GUI, keyboard, mouse, digital pen, microphone, mass storage device, etc. In some embodiments, a single touchscreen interface can be the input device 172 and the display 170.

The memory 162 includes computer program instructions that the processing unit 154 executes in order to implement one or more embodiments described herein. The application 156 is configured to perform some of the processes associated with the user device 110 as described herein. In some embodiments, the application 156 may be executed at least partially on the processing unit 154. The memory 162 may include random access memory (RAM), read only memory (ROM), and/or other persistent, non-transitory computer readable media. The memory 162 can store an operating system 164 that provides computer program instructions for use by the processing unit 154 or other elements included in the user device 110 in the general administration and operation of the user device 110. The memory 162 can further include computer program instructions and other information for implementing aspects of the present disclosure. For example, in some embodiments, the memory 162 includes an application configuration 166. The application configuration 166 may include instructions or other data for use in the execution of any of the telephone host system interaction processes described herein, which may be executed at the processing unit 154 or application 156.

The memory 162 may also include or communicate with one or more auxiliary data stores, such as data store 168. The data store 168 may electronically store data regarding one or more users or user accounts associated with the user device 110, or other information for execution of the application 156. As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service The elements included in the user device 110 may be coupled by a bus 174. The bus 174 may be a data bus, communication bus, or other bus mechanism to enable the various components of the user device 110 to exchange information.

In some embodiments, the user device 110 may include additional or fewer components than are shown in FIG. 1B. For example, a user device 110 may include more than one processing unit 154 or memory 162. In another example, the user device 110 may not be coupled to a display 170 (e.g., if the user device 110 is a smart speaker device or the like).

Automated Interaction with a Telephone Host System

Figure 2:
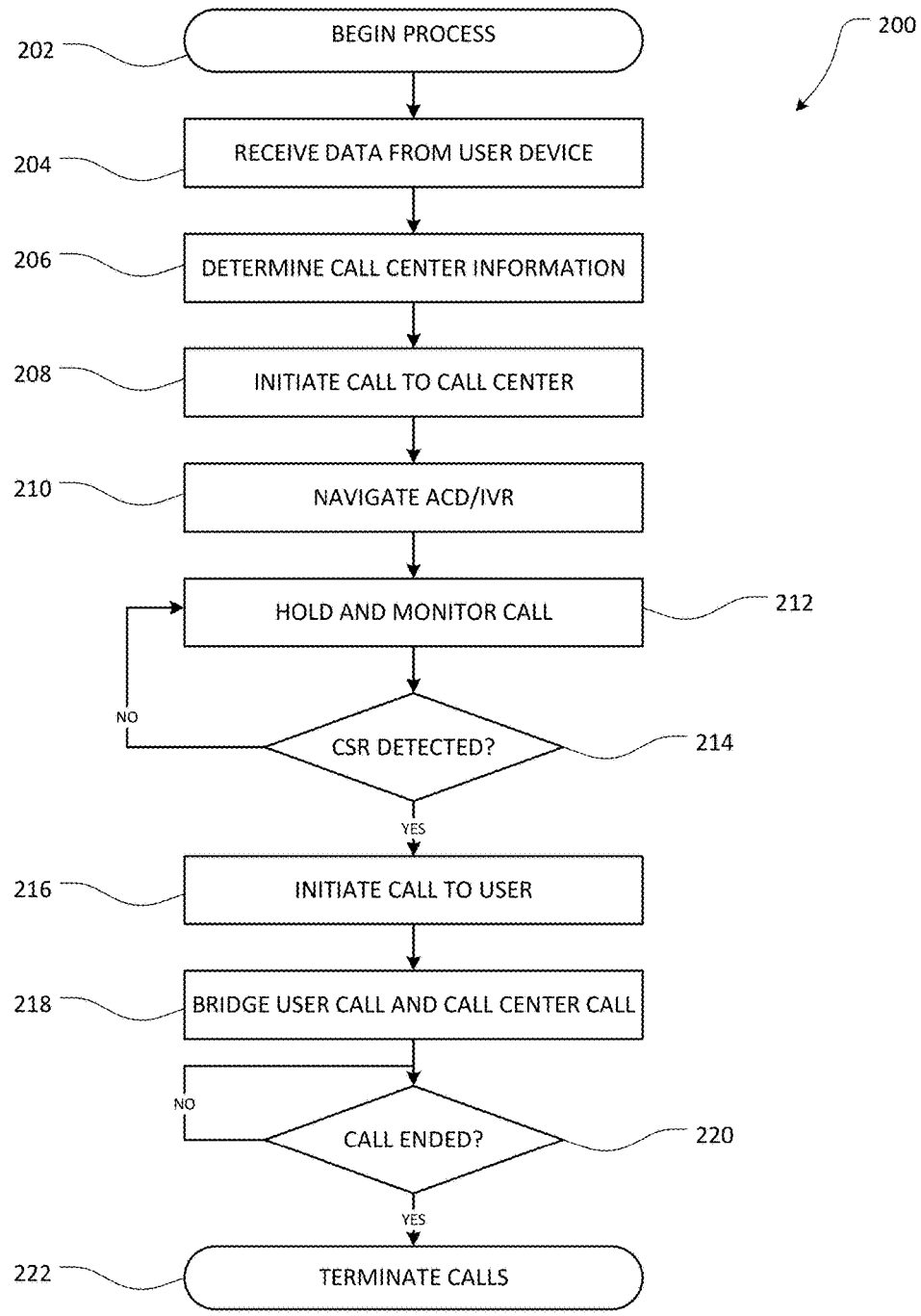
FIG. 2 is a flow diagram depicting an example method of automated interaction with a telephone host system.

FIG. 2 is a flow diagram depicting an example method of automated interaction with a telephone host system. The method 200 may begin at block 202 when a user initiates a request at a user device 110. For example, the user may select, through an application 156 executing on the user device 110, an option for a particular type of customer service, such as bank account assistance, a telephone assistance line associated with a product owned by the user, or the like. At block 204, the system 100 receives data from the user device 110. For example, the user device 110 can send the data input by the user, and/or other information derived based on the user input (e.g., a phone number, username account number, unique ID for the service provider, etc.), to the data center 120 where the data is received.

At block 206, call center information is determined based on the received data. In some embodiments, the user device 110 may determine a call center 140a, 140b, and/or a division or call path within a call center 140a, 140b that the user should be connected to, based on the user request. Call center information indicating the call center 140a, 140b, division, or call path can then be transmitted to the data center 120. Alternatively, the call center information can be determined at the data center 120 based on the user input and/or associated information received from the user device 110. Determining the call center information at block 206 can include, for example, looking up call information in the database 124 based on information in the user request. In some embodiments, the call center information may be determined and/or modified based on information associated with the user, such as the user's current location or area code, account information, status (e.g., association with a VIP number for preferred service), and/or type of user request (e.g., a particular department or division with a service provider). In some embodiments, further information may be obtained based on the user request. For example, the system may determine if the request was a frequent request from the user and/or an easily solvable request that may not require a call to a call center. In response to such determination, the user may be directed to an alternative solution (e.g., a customer service website or the like) in addition to or instead of placing a call to the call center.

At block 208, a call center call is initiated. Block 208 may include the data center 120 sending an instruction to the VoIP provider to initiate a call to a targeted call center 140a, 140b. Based on the instruction, the VoIP provider can initiate the requested call over the PSTN connection 132 or other selected communications path to the targeted call center. If the data center 120 is configured to initiate VoIP calls itself using a PSTN connection, the data center 120 may directly initiate the call to the call center. The call center call can be initiated via the PSTN network to a phone number associated with the call center.

At block 210, an automatic call distributor (ACD), interactive voice response (IVR) system, or other automated call handling system is navigated. For example, the navigation at block 210 can include receiving and responding to one or more audible prompts. Any audio signal provided by the call center can be received at the VoIP provider 130 and sent to the data center 120 via the data connection 126. At the data center 120, the audio signal received from the call center is analyzed, for example, based on a waveform analysis or other audio signal analysis, to determine the content of the audio signal. In one example, the data center 120 is configured to determine, based on the audio signal, whether the call center is producing a ringing tone, hold music, or a spoken message, or whether a live agent has answered the call center call. If a spoken message is detected, the data center can further use waveform analysis and/or natural language processing methods (e.g., automatic speech recognition, comparison of received audio to predetermined samples, detecting changes in volume level, ring back sounds, etc.) to determine if the spoken message is an advisory message (e.g., "please continue holding") or a prompt for user input (e.g., "say your first and last name," "enter your account number," etc.).

In some embodiments, the system 100 may have pre-existing information regarding the structure of the ACD/IVR system. For example, the system 100 may have determined a sequence of prompts that are asked of each caller, e.g., based on prompts received in previous user call flows, or based on one or more test calls placed independent of a user request for the purpose of mapping the ACD/IVR tree. If the structure of the ACD/IVR system is known, the data center 120 may provide a response (e.g., an audible representation of a verbal response to the prompt, dual-tone multi-frequency (DTMF) signal, or the like) without receiving and analyzing the full prompt.

When the ACD/IVR navigation reaches a target, such as an indication that the call center call will be directed to a live agent (e.g., a customer service representative), the call center call is held and monitored at block 212. Because call centers frequently receive calls at a greater rate than they can be answered by live agents, the call center call may be placed on hold at the call center. The system 100 monitors the held call by receiving the audio sent by the call center via the PSTN connection 132 and the data connection 126.

At decision state 214, the system 100 periodically determines if a customer service representative or other live agent is detected. For example, the system 100 can continuously or periodically analyze the audio received from the call center via the VoIP provider 130 to determine the content of the audio. If the system 100 determines that the received audio signal is a hold message or hold music, the system 100 can determine that a live agent has not been detected, and the method 200 returns to block 212 to continue monitoring the held call. If the system 100 determines at block 214 that the received audio signal is a voice of a live agent, rather than a recording, or if the received audio signal is a ringing tone indicating that a live agent will pick up the call shortly, the system 100 can determine that a live agent has been detected. When a live agent is detected, the method 200 continues to block 216.

At block 216, the data center 120 initiates a user call to the user device 110 such that the device is able to accept the call. For example, the data center 120 can initiate the call by sending a signal to the VoIP provider 130 via the data connection 126 to cause the VoIP provider 130 to call the user device 110 over the PSTN connection 114 or a data connection. When the user call has been established between the VoIP provider 130 and the user device 110, the user call and the call center call are bridged together at block 218. After the user call and the call center call are bridged together, the user can communicate directly with the agent at the call center as desired.

At block 220, the system 100 continuously or periodically monitors the VoIP call between the user and the live agent to determine if the call has been ended, for example, due to either the user or the call center hanging up or otherwise disconnecting after the service interaction is completed. If it is determined at block 220 that the call has not ended, the system 100 continues monitoring the call. If it is determined at block 220 that the call has ended, the system 100 proceeds to block 222, where the user call and the call center call, if still open, are terminated by the VoIP provider.

EXAMPLES

In some embodiments, one or more processors of the server are further configured with processor-executable instructions to perform operations comprising, before the live agent answers the call center call, navigating a call handling system of the call center by causing a response to be transmitted from the telephony service to the call center in response to an interactive voice response (IVR) prompt.

In some embodiments, the response is determined based at least in part on previously stored information associated with the call center, the previously stored information comprising at least one of a representation of the IVR prompt, a known sequence of IVR prompts, and a predetermined response.

In some embodiments, navigating the call handling system comprises receiving the IVR prompt transmitted from the call center, determining a data representation of at least a portion of the IVR prompt, and determining, based on natural language processing, that the IVR prompt is a request for the response.

In some embodiments, the one or more processors of the server are further configured with processor-executable instructions to perform operations comprising detecting, subsequent to causing the telephony service to bridge the user call and the call center call, that the user has been placed on a hold, transmitting a control message to suspend audio transmissions to the communication device, detecting, subsequent to transmitting the control message, that a live agent has answered the call center call, and transmitting a control message to resume audio transmissions to the communication device.

In some embodiments, the one or more processors of the server are further configured with processor-executable instructions to perform operations comprising detecting, subsequent to causing the telephony service to bridge the user call and the call center call, that a leg of the bridged call has been disconnected, responsive to determining that a leg of the bridged call has been disconnected, causing initiation of a new call from the telephony service to resume connection across the disconnected leg, and causing the telephony service to bridge the new call and the non-disconnected one of the user call and the call center call such that audio can be transmitted between the client communication device and the call center.

In some embodiments, the one or more processors of the server are further configured with processor-executable instructions to perform operations comprising causing the telephony service to transmit a proxy message to the live agent while the user call is initiated, the proxy message comprising an audio representation of a conversational response to the live agent.

In some embodiments, the proxy message is selected from a plurality of available proxy messages based at least in part on one or more words spoken by the live agent.

In some embodiments, the call center call is initiated based at least in part on call center information retrieved from a data store remote from the communication device.

In some embodiments, a method further comprises causing the telephony service to navigate a call handling system of the call center by transmitting a response to at least one interactive voice response (IVR) prompt transmitted by the call center.

In some embodiments, a method further comprises automatically answering, at the communication device, the user call in a speaker mode.

In some embodiments, a method further comprises transmitting a proxy message from the communication device to the call center while the user call is initiated.

In some embodiments, the proxy message is selected by the user at the communication device.

In some embodiments, the communication device is configured to simultaneously communicate with the telephony service via a data connection and a public switched telephone network (PSTN) connection.

Natural Language Processing

Figure 3:
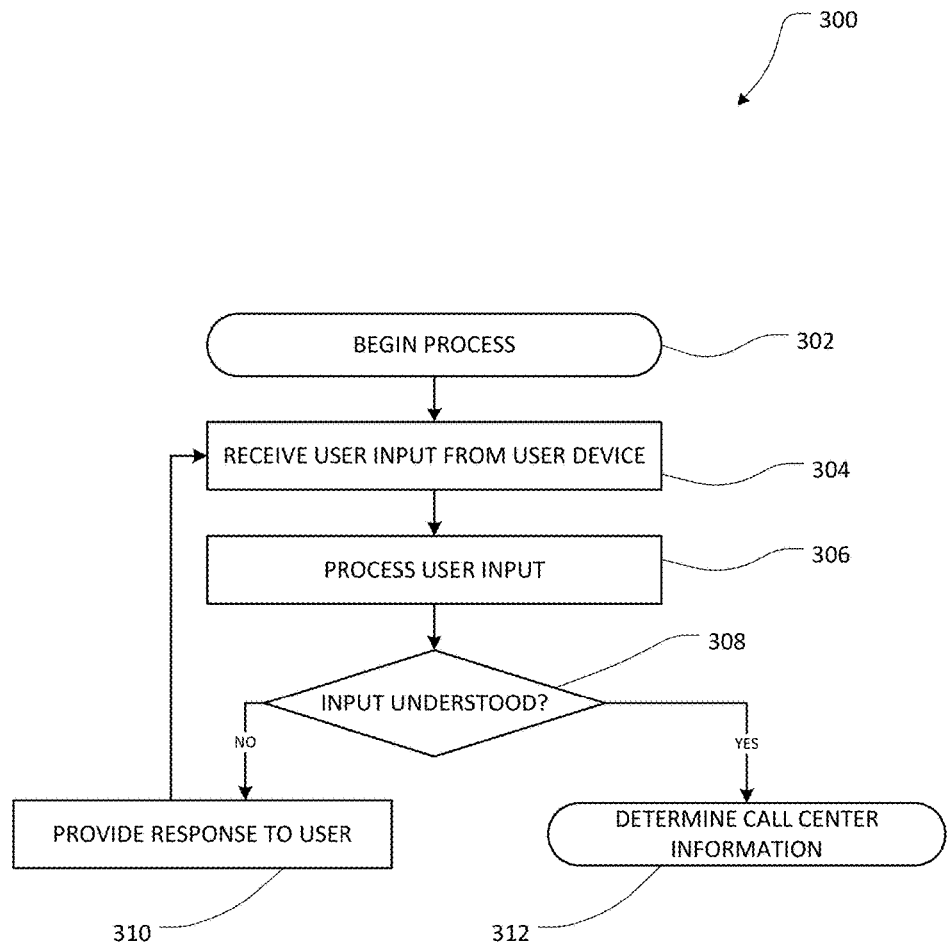
FIG. 3 is a flow diagram depicting an example method of initiating an interaction with a telephone host system using natural language processing.

FIG. 3 is a flow diagram depicting an example method of initiating an interaction with a telephone host system using natural language processing based on a spoken request received from a user. In various embodiments, the method 300 can be performed entirely at the user device 110, entirely at the data center 120, or by a combination of components at the user device 110 and the data center 120. The method 300 begins at block 302 when a user initiates a request at the user device 110. For example, the user may select an option from a menu presented on a graphical user interface (GUI) of the user device 110 (e.g., a GUI as depicted in FIGS. 11A-11D). In another example, the user may initiate the request by providing a spoken request to a virtual assistant, intelligent personal assistant, or similar program executing on the user device 110. In yet another example, if the user device 110 does not include virtual assistant functionality, the user may select an option to record and send a spoken request from the user device 110 to the data center 120 for processing. Non-limiting examples of user inputs include requests such as "I need to speak to my wireless carrier about a problem with my bill," "I want to request a refund for the sunglasses I ordered," "I need to reschedule my flight to Boston," "I need to tell my utility company about a power outage," etc.

At block 304, the user input is received from the user device 110. For example, the user device 110 can transmit the user's natural language input to the data center 120, where it is received for processing. In some embodiments, a virtual assistant can initially process the user input to determine that the user input is a request to speak to a customer service representative or other live agent at a call center. Based on the determination that the user input is a request to speak to a live agent, the virtual assistant program causes the user device 110 to transmit a digital representation of the spoken request to the data center 120.

At block 306, the user input is processed using one or more natural language processing methods to determine the content of the request. For example, the user input can be analyzed to determine the name of a company or other entity the user wishes to call, and to further determine the type of service requested (e.g., the system 100 can determine the name of the airline and that the user wishes to make a change to an existing reservation, etc.). When the user input has been processed, the method continues to decision state 308, where the system determines if the user input was understood. In some cases, a user input may not be understood, for example, if the user did not speak clearly, if the user phrased the question in a way that the natural language processing algorithm was not able to determine the substantive content of the request, if the call center entity was not able to be understood or recognized, if the user made an ambiguous request such that additional information is required, or the like.

If the natural language processing algorithm is not able to determine a call center or routing within the call center based on the user input, the input is not understood and the method 300 continues to block 310, where a response is provided to the user (e.g., "please repeat your request," "which airline?" or the like). After the response is provided to the user, the method 300 returns to block 304 when a subsequent user input is received, and the subsequent input is processed at block 306.

If the natural language processing algorithm is able to determine a call center or routing within the call center based on the user input, the input is understood at block 308, and the method 300 continues to block 312, where call center information is determined. For example, the data center 120 can determine an entity to call, a phone number associated with the entity, and/or information related to past calls to the call center. Some or all of the call center information may be retrieved from the database 124, or may be retrieved from a networked service, such as by performing a search using a search engine. When the call center information has been determined the method 300 terminates and a call may be initiated to the call center based on the call center information, as described above with reference to block 208 in FIG. 2.

EXAMPLES

In some embodiments, a response to an IVR prompt comprises at least one of a voice recording of the user, synthesized speech, and a dual-tone multi-frequency (DTMF) signal.

In some embodiments, the one or more processors of the server are further configured with processor-executable instructions to perform operations comprising determining that a live agent has answered the call center call, responsive to determining that the live agent has answered the call center call, causing initiation of a user call from the telephony service to the communication device, and causing the telephony service to bridge the user call and the call center call such that audio can be transmitted between the communication device and the call center.

In some embodiments, the one or more processors of the server are further configured with processor-executable instructions to perform operations comprising receiving a spoken message from the live agent, determining a data representation of at least a portion of the spoken message, selecting, based on natural language processing, one of a plurality of proxy messages to be transmitted to the live agent in response to the spoken message, and causing the telephony service to transmit the selected proxy message to the live agent while the user call is initiated.

In some embodiments, the one or more processors of the server are further configured with processor-executable instructions to perform operations comprising determining, based on an audio transmission from the call center, that the call center call is on hold, analyzing, based on natural language processing, one or more hold messages received from the call center to determine at least one item of information of the hold message, and obtaining a resource identifier based at least in part on the at least one item of information.

In some embodiments, the resource identifier comprises a URL of a customer service website of the service provider, and wherein the one or more processors of the server are further configured with processor-executable instructions to perform operations comprising transmitting the URL to the communication device.

Automatic Speaker Mode

Figure 4:
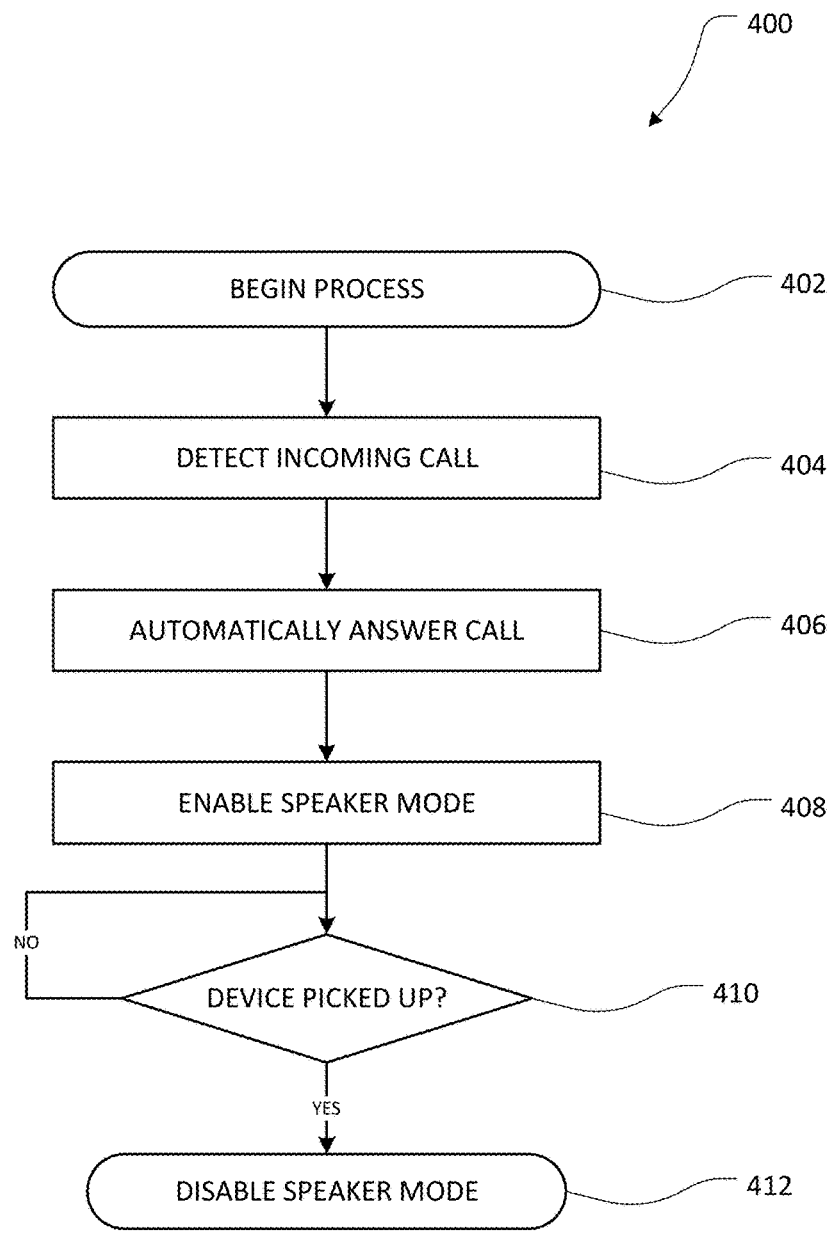
FIG. 4 is a flow diagram depicting an example method of user notification.

FIG. 4 is a flow diagram depicting an example method of user notification with automatic speaker mode functionality. The method 400 can be advantageous if a user wishes to speak to a live agent, but does not wish to take the time to navigate an ACD/IVR system or wait on hold. For example, the user may provide an initial request via user input as described above, and the application 156 on the user device 110 may indicate that the user will be contacted when the desired call has been set up. The method 400 can further allow the user to be notified when a live agent has been reached without requiring the user to actively monitor the user device 110 or risking disconnection by the live agent during a ringing period at the user device 110. The method 400 can be implemented at a user device 110, such as a smartphone, configured to operate alternately in a speaker mode (e.g., speaker phone or other loudspeaker mode) and a handset mode. The user device 110 may be executing an application associated with and configured to interact with the data center 120.

The method 400 begins at block 402 when an incoming call is initiated from the VoIP provider 130 and/or data center 120. For example, the incoming call can be a user call initiated at block 216 of method 200 in FIG. 2 based on the detection of a live agent at block 214. At block 404, the incoming user call is detected at the user device 110. For example, the user device 110 may receive an incoming phone call, and the application 156 executing on the user device 110 may determine that the incoming phone call is a user call associated with a prior user input (e.g., customer service request). In another example, the user device 110 may be programmed with a set of incoming phone numbers for which the auto speaker mode of method 400 is to be implemented. In some embodiments, the incoming user call may be identified, for example, by caller ID, a SIP header, push message or other feature within the app, etc. In yet another example, other incoming calls may be limited or dismissed such that the user device 110 will be available when the user call is received. Limiting of other incoming calls may be activated selectively, for example, when it is determined that the call handling system has been successfully navigated and no further inputs are necessary (e.g., the call is now simply on hold and will be connected to a live agent as soon as one is available). In some embodiments, the remaining expected wait time can be determined based at least in part on wait times determined recently for other calls to the same call center.

At block 406, the user call is automatically answered. For example, the application 156 may cause the user device 110 to automatically answer the call based on the determination that the incoming phone call is associated with the prior user input. At block 408, the speaker mode of the user device 110 is automatically enabled. Thus, the voice of the live agent answering the call will be audible in the vicinity of the user device 110. The audible voice of the live agent may signal to the user that the requested call has reached a live agent who is ready to speak to the user. In some embodiments, the speaker mode may be enabled before the user call and the call center call are bridged (e.g., at block 218 of FIG. 2), and the user device 110 may play a recorded notification sound through the speaker. In some embodiments, the speaker mode may be enabled while the call center call is still on hold, such that the audio played by the speaker is a holding sound such as music or a recorded message. Alternatively, the call may be answered while the call center call is still on hold, but in a mute mode, which may be deactivated as soon as an audio signal corresponding to the live agent is detected. In further embodiments, the timing for answering the user call may be determined based on previously collected data, such as an average amount of time taken for a live agent to be reached (e.g., based on queue length or other patterns).

At block 410, it is determined whether the user device 110 has been picked up or otherwise changed physical location since the call was automatically answered. For example, the application 156 or another application executing on the user device 110 can monitor data from one or more accelerometers, other motion sensors, proximity sensors, cameras, or the like, in the user device 110 to detect a movement indicative of the user device 110 being picked up by the user. If it is not determined that user device 110 has been picked up, the method 400 returns to block 410 and continues to monitor for device movement or proximity. If it is determined that the user device 110 has been picked up, the method 400 terminates at block 412 by disabling the speaker mode of the user device 110. For example, the disabling of speaker mode at block 412 may occur while the user is lifting the user device 110 (e.g., a smartphone) to the user's ear, such that the user can continue maintain a conversation with the live agent in a handset mode. Disabling the speaker mode may include enabling an alternate mode for transmitting and receiving audio or video for the call. For example, the alternate mode may activate a microphone to capture user audio and a speaker to present audio received from the live agent. Alternatively, if the user does not pick up the user device 110, the conversation between the user and the live agent may be maintained in a speaker mode indefinitely. In some embodiments, an option for the user to manually disable the speaker mode may be provided, e.g., as a button presented to the user in a GUI. The automatic transition to handset mode may be different from existing uses of the various sensors of a user device 110, which typically are used to turn the screen on and off based on proximity to the user's head when in handset mode, rather than in speaker mode. In some embodiments, the determination to transition to handset mode may be based at least in part on correlation of the user's sound volume with distance and/or background noise. In further embodiments, if the user device 110 is connected to a headset (e.g., a BLUETOOTH® headset or other system), and the user device 110 will automatically play the audio through the headset, rather than in speaker mode.

EXAMPLES

In some embodiments, detecting that the incoming call is the user call comprises identifying at least one of a source phone number, a session initiation protocol (SIP) header, and a push message associated with the incoming call, and determining that the identified source phone number, SIP header, or push message corresponds to the request information.

In some embodiments, the client application is further configured to: determine, based on an output of one or more sensors of the communication device, that the communication device has been picked up subsequent to answering the user call, and responsive to determining that the communication device has been picked up, cause the communication device to transition to the handset mode such that the communication device plays audio transmissions from the call center at a second volume lower than the first volume.

In some embodiments, the one or more sensors of the communication device comprise at least one of an accelerometer, a proximity sensor, a photodetector, and a microphone.

In some embodiments, the client application is further configured automatically dismiss incoming calls that are not the user call between a time when the request information is transmitted and a time when the user call is answered.

In some embodiments, the one or more processors of the server are further configured with processor-executable instructions to perform operations comprising causing the telephony service to transmit a proxy message to the live agent while the user call is initiated, the proxy message comprising an audio representation of a conversational response to the live agent.

In some embodiments, the proxy message is transmitted over the call center call and the user call such that at least a portion of the proxy message is played at the communication device in the speaker mode while at least a portion of the proxy message is being transmitted over the call center call.

In some embodiments, the one or more processors of the server are further configured with processor-executable instructions to perform operations comprising detecting, subsequent to the user call being answered, that the user has been placed on a hold, transmitting a control message to suspend audio transmissions to the communication device, detecting, subsequent to transmitting the control message that a live agent has answered the call center call, and transmitting a control message to resume audio transmissions to the communication device.

Proxy Message

Figure 5:
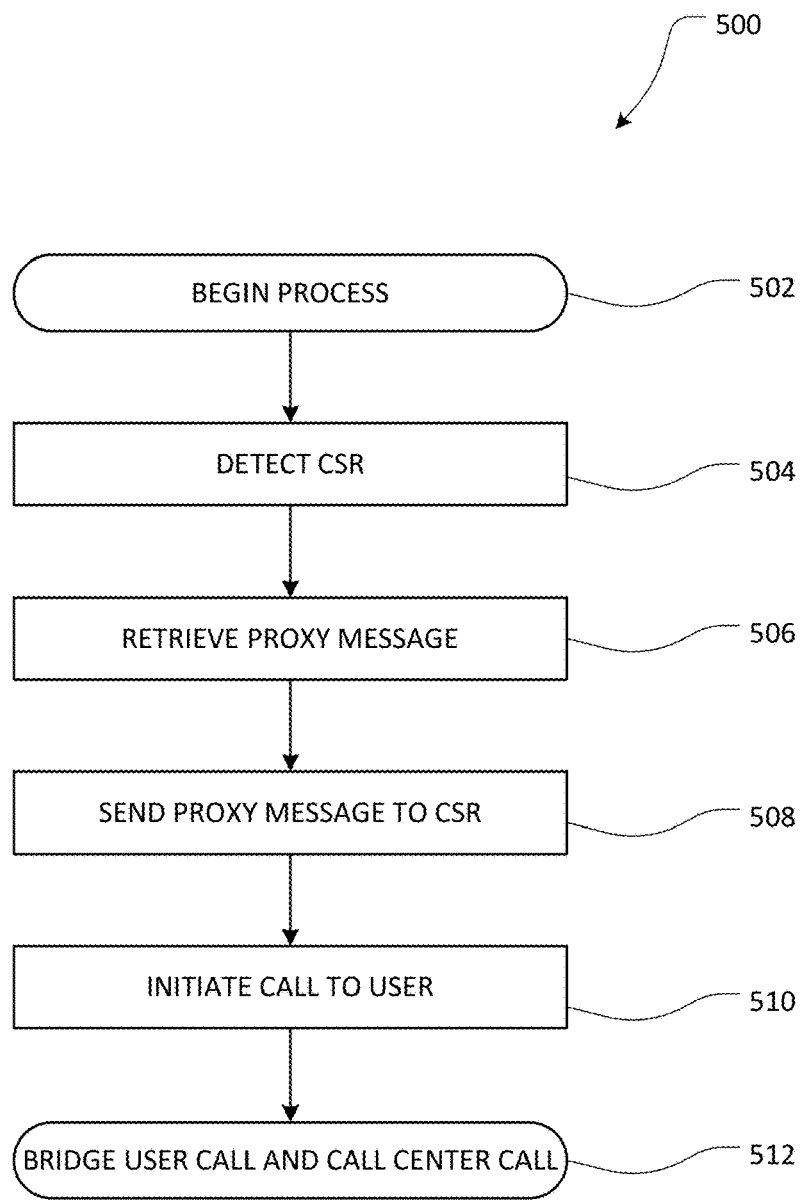
FIG. 5 is a flow diagram depicting an example method of maintaining a call center call using a proxy message.

FIG. 5 is a flow diagram depicting an example method of maintaining a call center call using a proxy message. As described above with reference to FIG. 2, the data center 120 may initiate the user call to the user device 110 based on the detection of a live agent. After the live agent answers the call center call, several seconds may elapse, while the user call is initiated and answered and the calls are bridged, before the user begins speaking to the live agent. In some cases, the delay due to initiating and bridging the user call may be long enough to cause the live agent to believe there is no user on the line and hang up before the user can be connected to the live agent. Thus, the proxy message method 500 depicted in FIG. 5 may be used to prevent the live agent from hanging up before the calls are bridged.

The method 500 begins at block 502 as a call is being held and monitored for a live agent. At block 504, a live agent is detected, as described above with reference to block 214 in FIG. 2. When the live agent is detected, a proxy message is retrieved at block 506. For example, the proxy message can be stored in the database 124, retrieved by the server 122, and sent to the VoIP provider 130.

At block 508, the proxy message is sent to the live agent via the PSTN connection 132. The proxy message can include an audio representation of a message to the live agent that will cause the live agent to remain on the line. Non-limiting examples of proxy messages include "please wait one moment while we connect your party," "hold on a second," "I'll be right back," etc. In some embodiments, the proxy message may be a default proxy message stored at the data center 120 to be used for all or many user devices 110. The proxy message may further customized for a user. For example, the user may pre-select one of several optional proxy messages at the user device 110, or the user may pre-record a custom proxy message in the user's own voice.

At block 510, the user call is initiated from the VoIP provider 130 to the user device 110, as described above with reference to block 216. At block 512, the method 500 terminates as the user call and the call center call are bridged together at the VoIP provider, as described above with reference to block 218. In various embodiments, blocks 510 and/or 512 may be performed while the proxy message is being played to the live agent, or may be performed subsequent to playing the proxy message. Preferably, the live agent remains on the line upon hearing the proxy message until the user call and the call center call are bridged together at block 512.

In some embodiments, the method 500 may include adaptive or "smart" proxy message functionality. A smart proxy message system may monitor the user call and the call center call to determine when the user has answered the user call and/or what the live agent has said when joining the call center call (e.g., to determine an appropriate response to the live agent out of a plurality of optional responses). In one example, if it is determined that the user has answered the user call in the middle of a proxy message being played to the live agent, the system may allow the message to finish playing such that the user hears the remainder of the proxy message and can determine how to interact accordingly with the live agent after the proxy message concludes (e.g., by not speaking during the proxy message, etc.). In another example, a plurality of optional proxy messages may include a message instructing the live agent to wait briefly, a message reciting the user's name, and other messages reciting other pieces of information that a live agent may be expected to ask for upon answering (e.g., an account number, birth date, or the like). Thus, the system can monitor the words spoken by the live agent upon answering and determine if the live agent has requested specific information or simply answered the call, and play an appropriate proxy message based on the detected words.

EXAMPLES

In some embodiments, a method further comprises receiving audio data for a user utterance to be presented when connecting with a live agent, storing, in a data store, the audio data, and responsive to determining that the live agent has answered the call center call, retrieving the audio data, wherein the proxy message comprises the audio data.

In some embodiments, a method further comprises receiving audio data comprising a plurality of instructions to be presented when connecting with a live agent, storing, in a data store, the audio data, and responsive to determining that the live agent has answered the call center call, retrieving the audio data, wherein the proxy message comprises the audio data.

In some embodiments, a method further comprises receiving data indicating a selection by the user of one of a plurality of messages to be presented when connecting with a live agent, storing, in a data store, the data, and responsive to determining that the live agent has answered the call center call, retrieving one of the plurality of messages.

In some embodiments, the proxy message is selected automatically from a plurality of available proxy messages based at least in part on natural language processing of one or more words spoken by the live agent.

In some embodiments, the proxy message comprises a response to a question asked by the live agent.

In some embodiments, at least a portion of the proxy message is simultaneously transmitted to the communication device after the user call and the call center call are bridged.

In some embodiments, a method further comprises causing, at least in part, the communication device to automatically answer the user call in a speaker mode such that at least one of a portion of speech of the live agent and a portion of the proxy message is played by a speaker of the communication device.

Secondary Hold Detection

Figure 6:
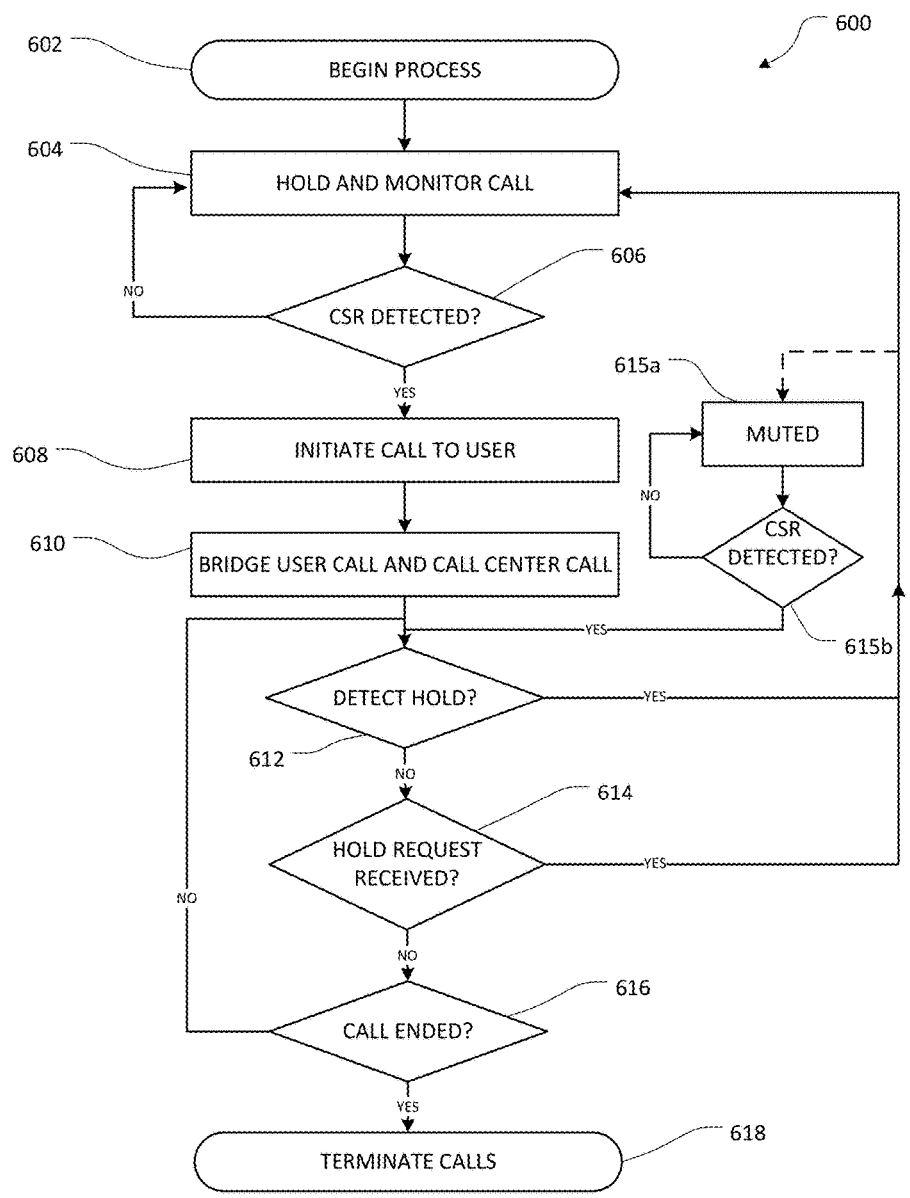
FIG. 6 is a flow diagram depicting an example method of secondary hold detection and management.

FIG. 6 is a flow diagram depicting an example method of secondary hold detection and management. In many live agent interactions, a user may be placed in a secondary hold. For example, the user may speak to the live agent for a period of time and then be placed on hold again while the live agent retrieves information, handles another call, speaks to a supervisor, or the like. When a secondary hold occurs, a user may wish to avoid actively listening for the duration of the secondary hold. In some cases, a secondary hold may be equally tedious as the initial hold prior to speaking to the live agent. Thus, the secondary hold detection and management method 600 may be implemented, such as within the method 200.

The method 600 begins at block 602 when a call center call has been placed and the ACD/IVR system has been navigated as described with reference to FIG. 2. Similar to the method 200, the call is held and monitored at block 604 until a live agent is detected at decision state 606, a user call is initiated at block 608, and the user call is bridged to the call center call at block 610. After the calls are bridged together, the call can be monitored to determine if a secondary hold has occurred.

At decision state 612, it is determined if a hold is detected. For example, a secondary hold can be detected based on the detection of hold-related audio such as a hold message or music, a hold transition tone, natural language processing detecting a phrase such as "please hold," or the like. If it is determined at decision state 612 that the user has been placed on a secondary hold, the method 600 returns to block 604, where the call is held and monitored again until a live agent is detected again at decision state 606. While the call is being held and monitored, the user may disconnect from the user call, and may be notified to join the call again when a new user call is initiated at block 608. If it is not determined at decision state 612 that the user has been placed on a secondary hold, the method 600 continues to decision state 614. At decision state 614, it is determined if a hold request has been received. A hold request may be initiated by the user at the user device 110, such as by selecting a "hold request" option from a GUI. The user may send a hold request, for example, if the live agent has placed the user on a secondary hold, but the secondary hold has not been detected (e.g., due to an error or a lack of a hold-related sound). Additionally, the hold request may be provided as an option in systems that are not configured to automatically detect secondary holds.

When a hold request is received at decision state 614, the method returns to block 604, similar to when a hold is detected at decision state 612, and the user may hang up until the hold is completed and a subsequent user call is generated. In some embodiments, the method 600 may alternatively continue to block 615a when a hold is detected at decision state 612 or decision state 614. At block 615a, the user call is not terminated or unbridged, and is put into a mute mode such that the user does not hear any hold-associated audio transmission. At decision state 615b, it is determined whether a live agent is detected. If a live agent is not detected at decision state 615b, the method returns to block 615a and remains in a mute mode. If a live agent is detected at decision state 615b, the call is unmuted and the method 600 returns to decision state 612 for further hold monitoring. In some embodiments, a proxy message, described above with reference to FIG. 5, may be provided to the live agent when the secondary hold terminates, in order to prevent the live agent from hanging up if the user is not immediately available while the subsequent user call is initiated. In some embodiments, an automatic speaker mode, described above with reference to FIG. 4, may be enabled to notify the user when a live agent has resumed the call.

If a secondary hold is not detected at decision state 612 and a hold request is not received at decision state 614, the method 600 continues to decision state 616. At decision state 616, the method 600 returns to decision state 612 to monitor for a hold if the call has not ended. If the call has ended, the method proceeds to block 618, where the calls are terminated.

EXAMPLES

In some embodiments, a control message causes the telephony service to terminate the user call, and a method further comprises monitoring the call center call to detect that the hold has terminated based at least in part on detecting, subsequent to sending the control message, that a live agent has answered the call center call; responsive to determining that the hold has terminated, causing initiation of a second user call from the telephony service to the communication device; and causing the telephony service to bridge the second user call and the call center call such that audio can be transmitted between the communication device and the call center.

In some embodiments, a method further comprises, responsive to determining that the hold has terminated, transmitting a proxy message to the call center while the second user call is initiated.

In some embodiments, a method further comprises causing, at least in part, the client communication device to automatically answer the second user call in a speaker mode.

In some embodiments, the control message causes the telephony service to place the user call into a muted mode such that audio transmitted from the call center is not played by the client communication device, and wherein the method further comprises monitoring the call center call to detect that the hold has terminated based at least in part on audio data received from the call center, and responsive to determining that the hold has terminated, deactivating the muted mode such that audio transmitted from the call center is played by the communication device.

In some embodiments, a method further comprises, responsive to determining that the hold has terminated, activating a speaker mode of the communication device.

Pre-Queuing

Figure 7A:
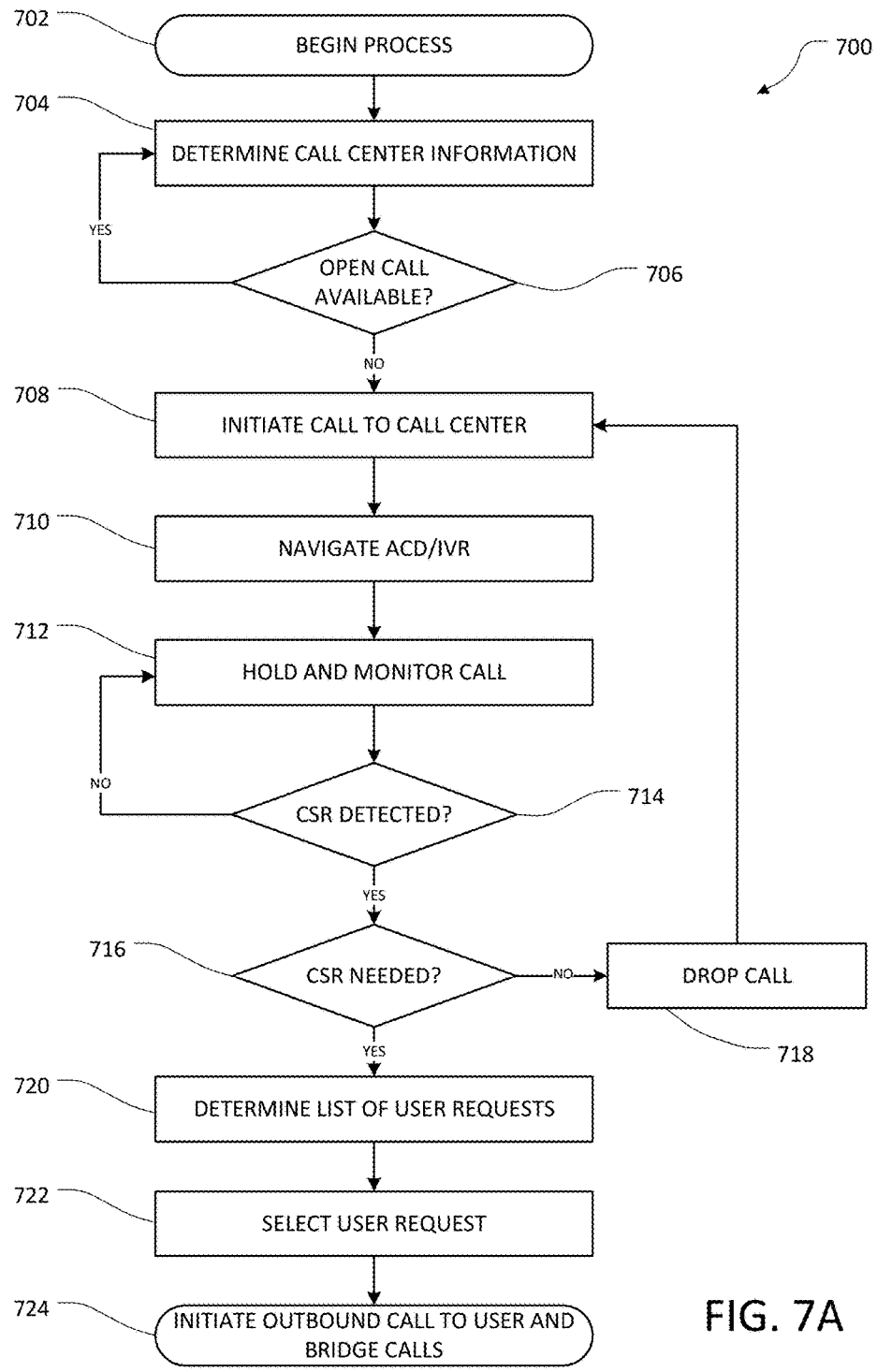
FIG. 7A is a flow diagram depicting an example method of call center call pre-queuing.

FIG. 7A is a flow diagram depicting an example method of call center call pre-queuing. Call center call pre-queuing may be utilized to reduce the amount of time a user has to wait between providing the initial user input to request a call, and receiving the user call to speak to a live agent. The call center call pre-queuing method of FIG. 7A may be an ongoing process performed repeatedly by the data center 120 in conjunction with the VoIP provider 130 for any number of call centers. As will be described with reference to both FIGS. 7A and 7B, pre-queuing can be used to maintain one or more open call center calls that do not correspond with an active user request, but has one or more combinations of call center navigation options, depending on the call center organization and/or structure of the call center, such that the open call center call is available for the next user requesting call to the associated entity with the appropriate request combination.

The method 700 begins at block 702 when pre-queuing is initiated. For example, the data center 120 may target pre-queuing to one or more call centers that are frequently called by users. For each call center that will be pre-queued, the data center 120 may initiate call center calls to the call center repeatedly and/or at regular intervals, such as every 5 seconds, 10 seconds, 30 seconds 1 minute, etc. Alternatively, the data center 120 may initiate a first call center call to the call center and initiate a new call each time the pre-queued call is terminated or bridged to a user call. In some embodiments, the call center calls may be pre-queued on a pre-determined and/or dynamically adjusted schedule. For example, the schedule may initiate calls based on known call center traffic patterns (e.g., calls may be initiated more frequently at times of day when call centers are known to be busy and/or when users are more likely to request calls to a particular call center). In another example, the rate of initiation of call center calls may be dynamically increased, for example, if it is determined that calls are currently experiencing unusually long hold times. At block 704, the call center information corresponding to the call center is determined. For example, the call center information can include a phone number of the call center, ACD/IVR architecture information, a series of responses to be provided to the ACD/IVR system, or the like.

At decision state 706, the data center 120 may determine if an open call to the targeted call center or subdivision of a call center is already available. If an open call is already available, it may be determined that placing an additional call center call would be redundant and/or not necessary. For example, to conserve resources, the data center 120 may wait to place a new pre-queuing call center call until the open call center call has either been terminated by the call center or bridged to a user call. If a pre-queued call center call is already available, the method 700 returns to block 704 to determine subsequent call center information (e.g., to identify another call center to be pre-queued). If an open call center call is not available for the targeted call center, the method 700 continues to block 708 to initiate a pre-queued call center call.

At block 708, the call center call is initiated. The data center 120 can cause the VoIP provider to initiate a call to the call center via PSTN connection 132. At block 710, the ACD/IVR system is navigated, and the call is held and monitored at block 712 until a live agent is detected at decision state 714, as described above with reference to blocks 210 and 212, and decision state 214 in FIG. 2.

When a live agent is detected at decision state 714, the method determines at decision state 716 if the live agent is needed. For example, the data center 120 can compare the call center information corresponding to the call center call with a list of pending user requests for call center calls. If the data center 120 determines that there is not a pending user request associated with the call center, the live agent is not needed, and the method 700 continues to block 718, where the call center call is dropped. For example, the data center 120 can cause the VoIP provider to disconnect the call center call. When the call is dropped, the method 700 returns to block 708, where a subsequent call center call is initiated.

If it is determined at decision state 716 that the live agent is needed, the method continues to block 720. At block 720, a list of user requests is determined. For example, the list can include all pending user requests associated with the particular call center and/or call center division associated with the present live agent. At block 722, the data center 120 selects one user request from the list to be connected to the call center call. In some embodiments, the user request can be selected at random from the list. In other embodiments, the data center 120 selects the user request that has been pending the longest. Additionally, the data center 120 may select a user request associated with a user that has subscribed to a priority service (e.g., a user may have paid for a priority status that causes the user's requests to be transferred to a live agent before requests from non-priority users). After the user request is selected, the method 700 terminates at block 724, where the data center 120 causes the VoIP provider 130 to initiate an outbound user call to the user device 110 associated with the selected user and bridge the user call to the active call center call.

Figure 7B:
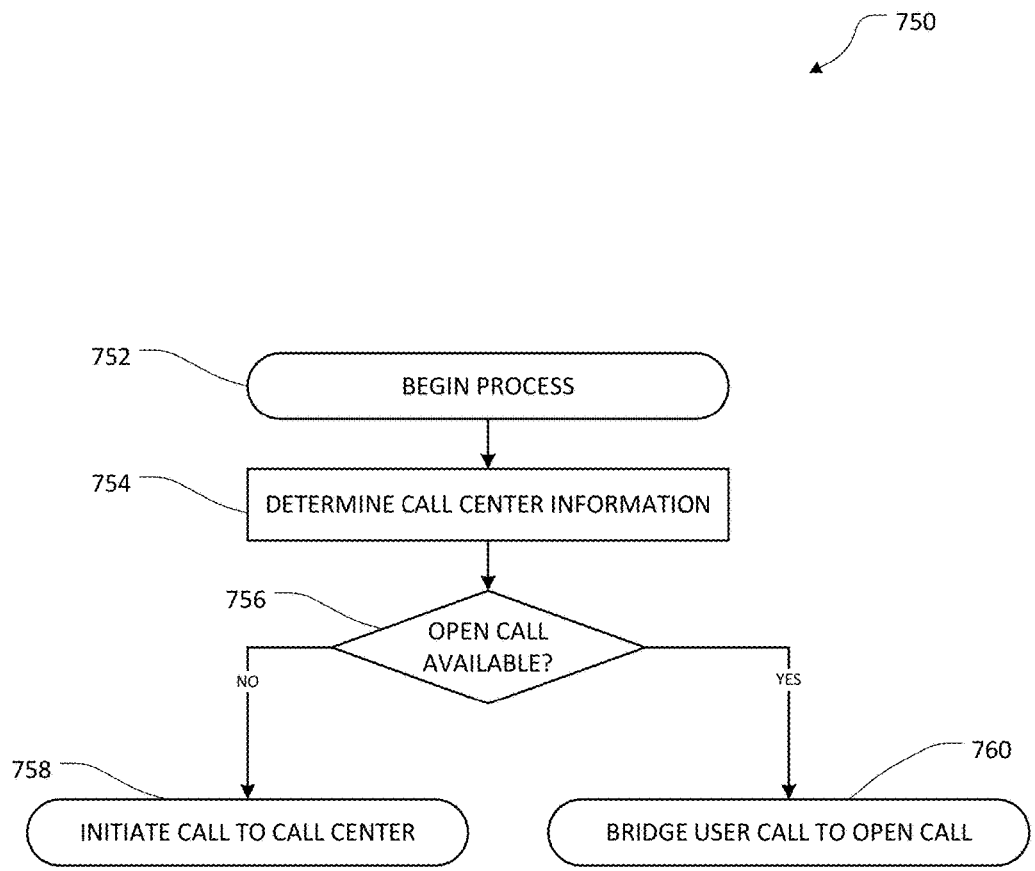
FIG. 7B is a flow diagram depicting an example method of connecting a user call in a system utilizing call center call pre-queuing.

FIG. 7B is a flow diagram depicting an example method of connecting a user call in a system utilizing call center call pre-queuing. The method 750 begins at block 752 when the data center 120 receives a user request from a user device 110 to speak to a representative at a call center for which pre-queuing is implemented. At block 754, the data center 120 can determine the call center information corresponding to the user request, and can determine that the call center information is associated with pre-queuing. If the call center information indicates that the call center is pre-queued, the method 750 continues to decision state 756.

At decision state 756, the data center 120 determines whether an open call center call corresponding to the request is available. The determination at decision state 756 may include adding the user's request to a list of requests corresponding to the call center information. An open call center call may be considered available if the user request is the request selected from the list at block 722 of FIG. 7A. If an open call is not available, the method 750 proceeds to block 758, where a call center call is initiated. The call flow then continues as described with reference to FIG. 2, with the call being monitored on hold until a live agent is available. If an open call center call is available at decision state 756, the method 700 terminates at block 760, where a user call to the user is bridged to the available open call center call. When the calls are bridged, the user may be able to speak immediately with a live agent, or the call flow may continue before the user is able to speak with a live agent. For example, if the open call is still on hold, the call flow may continue to block 212 (FIG. 2). Additionally, after the calls are bridged, the call flow may continue to an automatic speaker mode process (FIG. 4) and/or a proxy message process (FIG. 5) before the user can speak with a live agent.

EXAMPLES

In some embodiments, a pending request is selected from a plurality of pending requests.

In some embodiments, the selected request is selected based on at least one of an elapsed time since the selected request was submitted and a priority status of the user associated with the selected request.

In some embodiments, the call center is selected for pre-queuing based at least in part on being frequently called by users associated with the server.

In some embodiments, the one or more processors of the server are further configured with processor-executable instructions to perform operations comprising, prior to the live agent answering the first pre-queued call center call, causing the telephony service to initiate a second pre-queued call center call to the call center; determining, based on the received request information, that the service provider corresponds to a second pending request for a customer service call; causing initiation of a second user call from the telephony service to a second communication device associated with the second pending request; and causing the telephony service to bridge the second user call and the second pre-queued call center call such that audio can be transmitted between the second communication device and the call center.

In some embodiments, the one or more processors of the server are further configured with processor-executable instructions to perform operations comprising detecting, subsequent to causing the telephony service to bridge the user call and the first pre-queued call center call, that the first pre-queued call center call has been disconnected, responsive to determining that the first pre-queued call center call has been disconnected, identifying a second pre-queued call center call to the call center that has been answered by a live agent, and causing the telephony service to bridge the user call and the second pre-queued call center call.

In some embodiments, wherein the user call is assigned to an elevated priority for the second pre-queued call center call, relative to other pending requests associated with the call center.

In some embodiments, the one or more processors of the server are further configured with processor-executable instructions to perform operations comprising determining that a live agent has answered a subsequent pre-queued call center call, determining, based on the received request information, that the service provider does not correspond to any pending requests, and causing the telephony service to terminate the subsequent pre-queued call center call.

Disconnect Detection

Figure 8A:
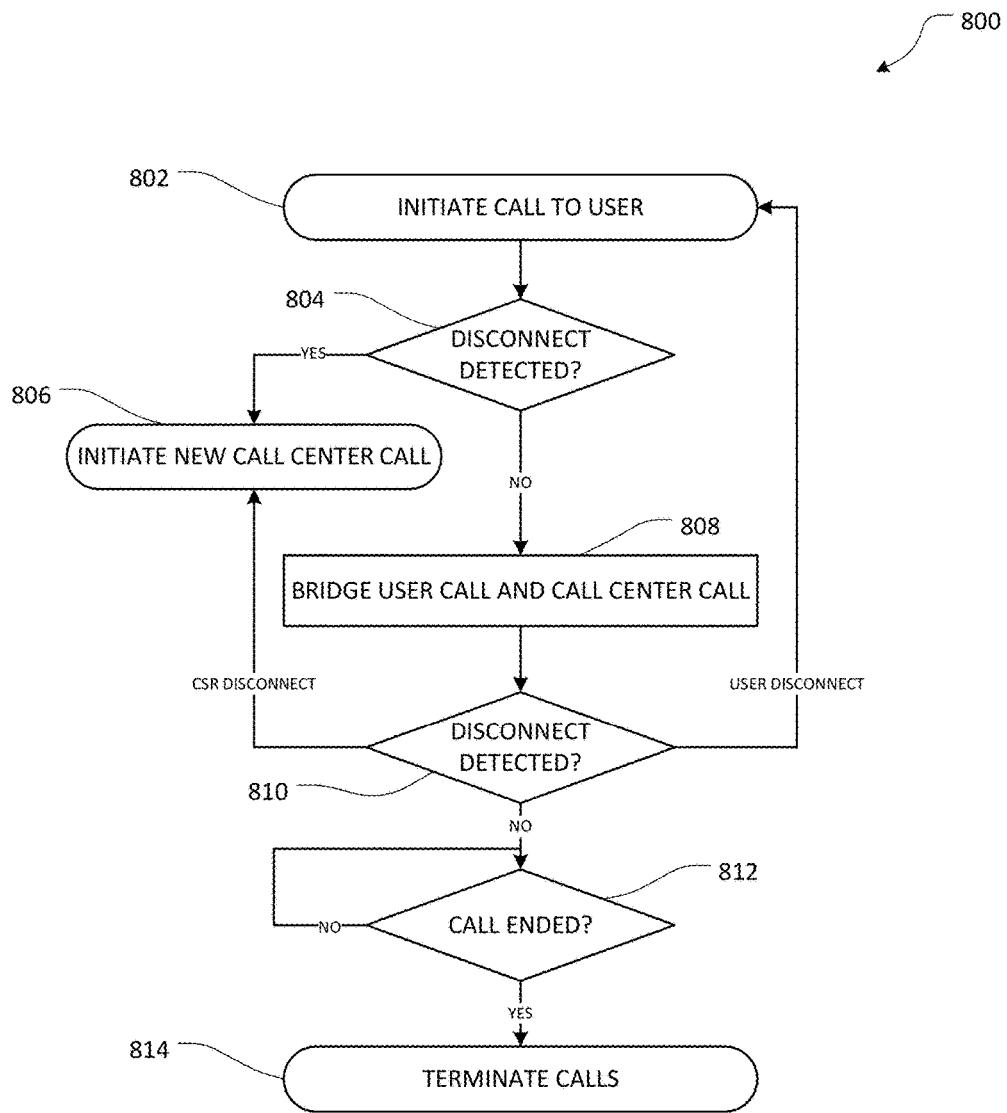
FIG. 8A is a flow diagram depicting an example method of disconnect detection and management.
Figure 8B:
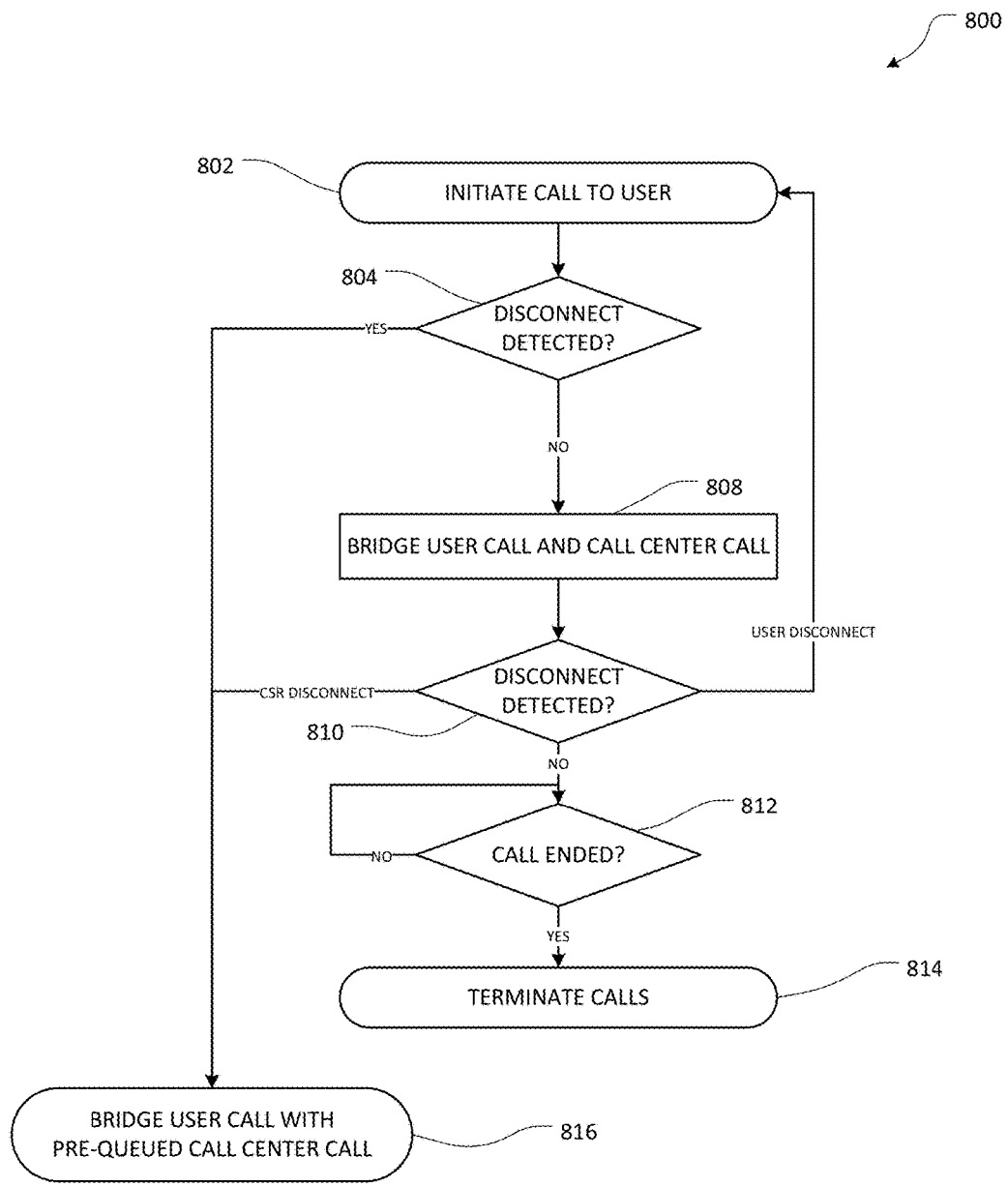
FIG. 8B is a flow diagram depicting an example method of disconnect detection and management in a system utilizing call center call pre-queuing.

FIGS. 8A and 8B are flow diagrams depicting example methods of disconnect detection and management. During the course of any of the calls described herein, a disconnection may occur unexpectedly. For example, the user device 110 may disconnect from a user call for various reasons such as a hardware or software malfunction at the user device 110, a disconnection in the PSTN connection 114 (e.g., due to poor signal reception, a problem at the cellular network provider, etc.) or a malfunction at the VoIP provider 130. In another example, a call center may be disconnected from a call center call for similar reasons. As will be described with reference to FIGS. 8A and 8B, the systems and methods described herein may be used to mitigate the additional time and inconvenience associated with repeating a call due to an unexpected disconnection of any leg (e.g., a user call, call center call, or other leg) of the call. FIG. 8A depicts a method 800 for disconnect detection and management implemented in a system in which call center call pre-queuing is not implemented or unavailable. FIG. 8B depicts the method 800 as implemented with call center call pre-queuing.

The method 800 begins at block 802 when a user call is initiated from the VoIP provider 130 to the user device 110. For example, the method 800 can begin when block 216 occurs in method 200 as depicted in FIG. 2. As shown in decision states 804 and 810, a disconnection event may be detected after the user call is initiated but before the user call and the call center call are bridged at block 808, or after the user call and the call center call are bridged at block 808. At decision state 804, either the user device 110 or the call center can be disconnected from the VoIP provider 130 prior to the bridging of the two calls at block 808. If pre-queuing is not available, a disconnection event detected at decision state 804 will result in a new call center call being initiated at block 806. At block 806, the method 800 terminates and the call flow can return to block 208 depicted in FIG. 2. If pre-queuing is available, a disconnection event detected at decision state 804 will result in the user call being bridged to another pre-queued call center call 816. If the disconnection event was associated with the user call, a new user call can be initiated as well and bridged to the pre-queued call center call.

At decision state 810, either the user device 110 or the live agent can be disconnected from the VoIP provider 130 after the user call and the call center call are bridged together at block 808. If the user device 110 is disconnected from the VoIP provider 130, the method 800 returns to block 802, where a new user call is initiated to the user device 110. In some embodiments, the data center 120 can provide a proxy message to the live agent responsive to the detection of the user disconnection, such that the live agent maintains the call center call while the new user call is connected and bridged to the call center call. If the call center call is disconnected and pre-queuing is not available, the method 800 terminates at block 806, where a new call center call is initiated and the user may have to wait while the ACD/IVR system is navigated and any necessary holding occurs. If the call center call is disconnected and pre-queuing is available, the user call can be bridged to another pre-queued call center call at block 816.

EXAMPLES

In some embodiments, the detecting comprises detecting that the user call has been disconnected, and causing the telephony service to bridge the non-disconnected one of the user call and the call center call to the second call comprises causing initiation of a second user call from the telephony service to the client communication device, and causing the telephony service to bridge the second user call and the call center call.

In some embodiments, the detecting comprises detecting that the call center call has been disconnected, and causing the telephony service to bridge the non-disconnected one of the user call and the call center call to the second call comprises causing initiation of a second call center call from the telephony service to the call center, determining that a live agent has answered the second call center call, and responsive to determining that the live agent has answered the second call center call, causing the telephony service to bridge the user call and the second call center call.

In some embodiments, a method further comprises transmitting a control message to suspend audio transmissions to the client communication device until the live agent answers the second call center call.

In some embodiments, a method further comprises responsive to detecting that the call center call has been disconnected, causing the telephony service to disconnect the user call, and responsive to determining that the live agent has answered the second call center call, causing the telephony service to initiate a second user call and bridge the second user call with the second call center call.

In some embodiments, the detecting comprises detecting that the call center call has been disconnected, and causing the telephony service to bridge the non-disconnected one of the user call and the call center call to the second call comprises identifying an available pre-queued call center call to the call center, determining that a live agent has answered the second call center call based at least in part on audio data received from the call center, and responsive to determining that the live agent has answered the second call center call, causing the telephony service to bridge the user call and the second call center call.

In some embodiments, a method further comprises transmitting a control message to suspend audio transmissions to the client communication device until the live agent answers the second call center call.

In some embodiments, a method further comprises transmitting a proxy message to the call center in response to determining that the live agent has answered the call center call.

Visual User Survey

Figure 9:
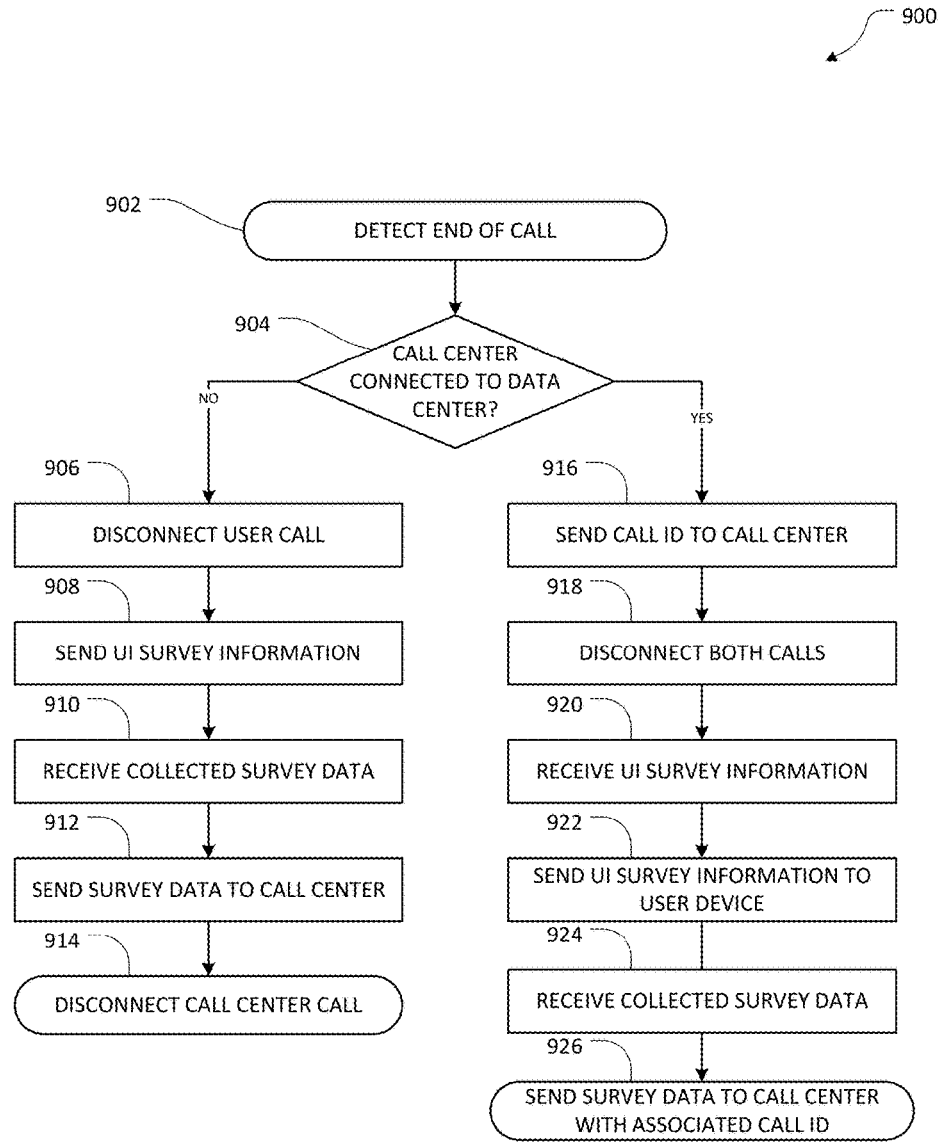
FIG. 9 is a flow diagram depicting an example method of conducting a user survey through a user device interface.

FIG. 9 is a flow diagram depicting an example method of conducting a user survey through a user device interface. Call centers frequently utilize automated in-call surveys, for example, to collect feedback from users after their interaction with a live agent is terminated. Users may be given an option to remain on the line after the live agent disconnects, and the user may be prompted by one or more IVR prompts to provide responses to survey questions. Frequently, users elect not to participate in such in-call surveys due to the additional time required. The methods depicted in FIG. 9 may enhance the speed and efficiency of survey data collection and/or encourage greater participation by providing the survey questions and receiving responses through a GUI of the user device 110 rather than through IVR responses. In some embodiments, the method 900 can be implemented with call centers such as the call center 140*a* depicted in FIG. 1A, which may have an existing relationship with the data center service, and may be configured to interact with the data center via data connection 128.

The method 900 begins at block 902 when the end of a call with a live agent is detected. The end of a call can be detected, for example, by determining that the call has been transferred (e.g., the call center call may have been transferred from the live agent to an automated survey extension), or by using natural language processing to detect phrases indicative of the end of a call (e.g., "goodbye," "thank you," "would you like to complete a survey?" etc.). When the end of the call is detected, the method 900 continues to decision state 904. At decision state 904, the data center 120 determines whether the call center is a call center 140*a* configured to communicate directly with the data center 120 or a call center 140*b* that is not in direct data communication with the data center 120.

If the call center is a call center 140*b* that does not communicate directly with the data center 120, the method 900 continues to block 906, where the user call is disconnected. The call center call remains open at the VoIP provider 130. If the call center 140*b* is aware that the user is associated with the service provider, the call center call is routed to a survey processing extension of the call center 140*b*, where the call center call is held until survey information is received.

At block 908, visual GUI survey information is sent to the user device 110, where the survey can be presented visually to the user. In some embodiments, each question may be converted to text by a speech-to-text function or other audio processing function of the data center 120. The text of each question can then be presented to the user via the display 170 of the user device 110. The user can provide a response via the input device 172, and the response can be sent from the user device to the data center 120. At block 910, the collected survey data is received at the data center 120.

At block 912, the data center 120 sends the survey data to the call center as a response to the IVR prompt. For example, a numeric survey answer can be provided by sending a DTMF tone from the VoIP provider 130 to the call center 140*b* via the PSTN connection 132. A short text answer can be sent to the call center 140*b* via DTMF tones that can be interpreted at the call center by number-to-text protocols such as T-9 or the like. Thus, while the user device 110 is disconnected from the VoIP provider and is interacting with the user via a GUI, the call center 140*b* is able to receive survey responses via DTMF tones in real time as though the user had remained on the line to complete the survey. After the survey is complete, the method 900 terminates at block 914 when the data center 120 causes the VoIP provider 130 to disconnect the call center call.

If the call center is a call center 140*a* that does communicate directly with the data center 120, the method 900 proceeds from decision state 904 to block 916 for enhanced survey functionality. At block 916, a component of the system 100, such as the data center 120 or the user device 110, sends a unique call or user identifier code to the call center 140*a*. The identifier can be associated with the call, the user device, and/or the user, and may or may not be anonymous. At the call center 140*a*, the completed live agent call session is associated with the identifier. After the identifier is sent, the VoIP provider 130 can disconnect both the user call and the call center call at block 918.

At block 920, the data center 120 receives user interface survey information from the call center 140*a*. The survey information can be generated by the call center 140*a*, and can include one or more generic survey questions and/or one or more survey questions selected or generated based on any aspect of the completed live agent call session. At block 922, the data center 120 sends the survey information to the user device 110 so that the user can be prompted to complete the survey. At block 924, the data center 120 receives survey data collected from the user at the user device 110. At block 926, the data center 120 sends to survey data and the associated call identifier to the call center 140*a*. At the call center, the collected survey data can be recorded and associated with the call identifier, for example, in a database of an entity associated with the call center. Because the survey is associated with a unique call identifier, the survey can be completed immediately or at a later time and real time responses are not required, although the survey can be completed without disconnecting the call connection. The survey data can be associated with the user's call at any time due to the associated call identifier.

EXAMPLES

In some embodiments, detecting the end of a call comprises determining that the call has been transferred.

In some embodiments, causing, at least in part, transmission to the client communication device of the visual representation of the IVR prompt comprises receiving an audio representation of the IVR prompt, processing the audio representation to produce a visual representation of the IVR prompt, and transmitting the visual representation to the client communication device.

In some embodiments, transmitting the user response to the call center comprises generating an audio representation of the user response and transmitting the audio representation to the call center as a response to the audio representation of the IVR prompt.

In some embodiments, causing, at least in part, transmission to the communication device of the visual representation of the IVR prompt comprises receiving, via a data connection with the call center, a visual representation of the IVR prompt, receiving, via the data connection with the call center, an identifier associated with the call, and transmitting the visual representation to the communication device.

In some embodiments, transmitting the user response to the call center comprises associating the response with the call based at least in part on an identifier for the client communication device received with the response, and transmitting, via the data connection with the call center, a representation of the user response and the identifier associated with the call.

Multi-Channel Processing

Figure 10:
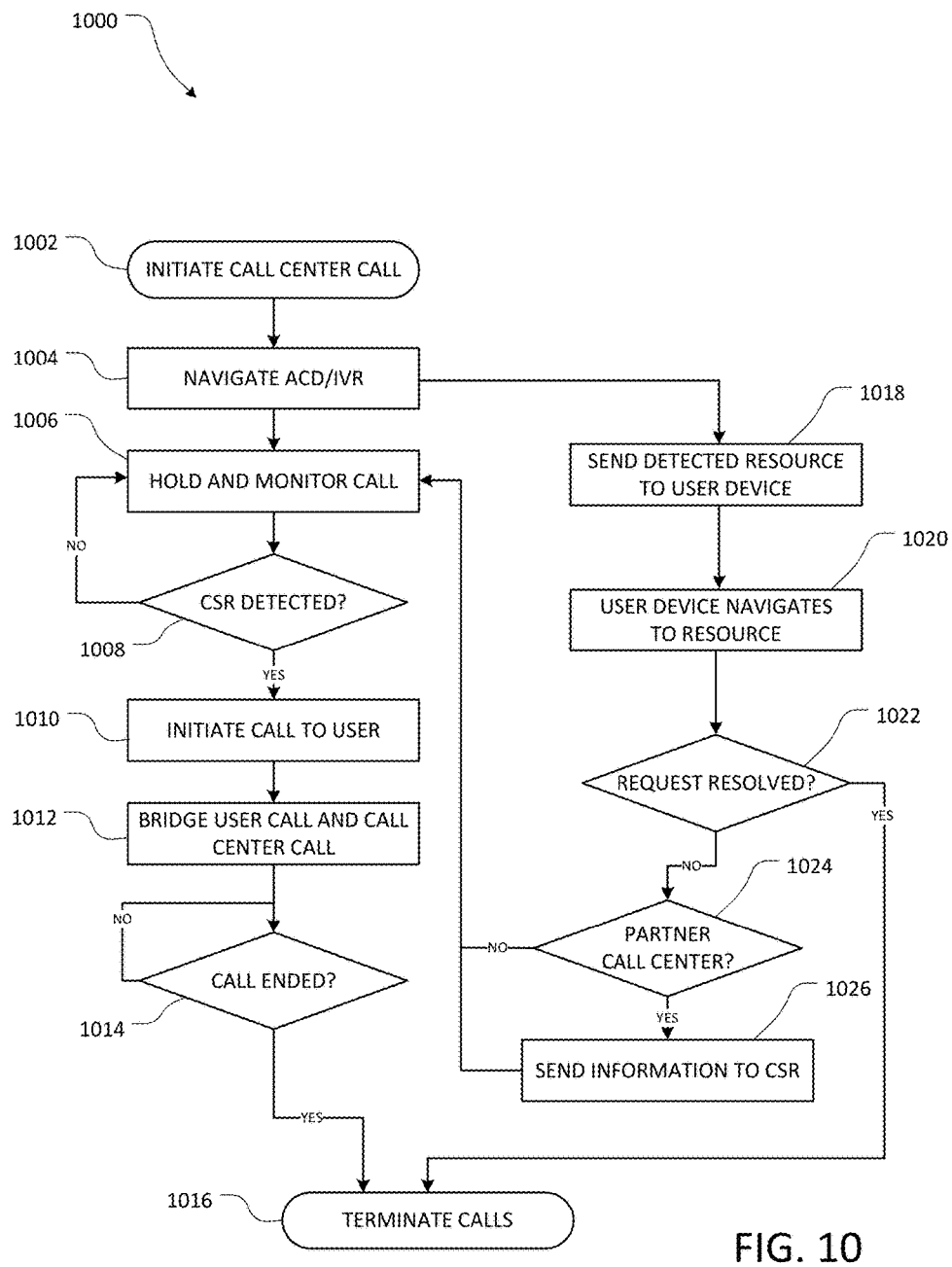
FIG. 10 is a flow diagram depicting an example method of multi-channel processing to resolve a user request.

FIG. 10 is a flow diagram depicting an example method of multi-channel processing to resolve a user request. In many cases a user may request a call to a call center to resolve an issue that may be resolvable by one or more other channels, for example, "self help" channels such as a frequently asked questions page ("FAQ"), a chat bot or live chat hosted by the entity associated with the call center, an internet-based inquiry or request such as an online form or service request, or the like. The methods depicted in FIG. 10 may implement multi-channel functionality to assist the user in resolving the issue while the user device is not connected to a user call. In some cases, the user's issue may be resolved while the server 122 is still navigating the call center or monitoring a held call center call, such that the call center call is no longer required and can be disconnected or matched with another outstanding user request. In some embodiments, the method 1000 can be implemented by the user device 110 depicted in FIG. 1, which may be configured to access the internet or other network resources via a data connection.

The method 1000 begins at block 1002 when a call center call is initiated. As described above with reference to FIG. 2, the call center call may be initiated based on a user request, after call center information has been determined. At blocks 1004, 1006, an ACD, IVR system or other automated call handling system is navigated. While the call handling system is being navigated, a resource may be detected from the call handling system. For example, audio content transmitted from the call center may indicate a resource identifier such as a URL or other identifier for a customer service site. In some embodiments, the resource may be received additionally or alternatively from hold audio played while the call center call is on hold at block 1006, and/or may be a known self-help resource stored in the database 124 or other data store of the system 100. If a customer service or inquiry resource is detected, the method 1000 continues in parallel to block 1018 while ACD/IVR navigation (block 1004) and/or hold monitoring (block 1006) continue.

At block 1018, the detected resource is sent to the user device 110. Upon receiving the resource, the user device 110 may determine if the resource is appropriate for the user request (e.g., if the resource can be used to resolve the user request). For example, if the user request corresponds to a general inquiry and the detected resource is a URL of a FAQ page, it may be determined that the resource is appropriate for the user request. In another example, if the user request corresponds to a request for service, or the user is requesting to report a problem, and the detected resource is a URL of a FAQ page, it may be determined that the resource is not appropriate for the user request. If the resource is appropriate for the user request, the method 1000 continues to block 1020.

At block 1020, the user device 110 navigates to the resource. For example, the application 156 executing on the user device 110 may automatically cause a browser application to open and navigate to the resource, or the user may be prompted with an option to navigate to the resource. For example, the user device 110 may display a prompt asking if the user would like to try to resolve the request via live chat while waiting for a phone call with a customer service representative. The user may then navigate to the resource and attempt to find the desired information, discuss their request with a chat bot or with an agent through a live chat, or the like.

At block 1022, it is determined if the request has been resolved. For example, the application 156 may prompt the user with a question about whether the request was resolved, or may display one or more selectable options on the screen while the user is accessing the self help resource (e.g., a "resolved" button and a "not resolved" button, etc.). If the user indicates that the request has been resolved, the method 1000 continues to block 1016. At block 1016, it is determined that the user no longer needs the call center call. If the call center call is not needed for another open user request, the call center call is terminated. If the user indicates that the request could not be resolved by the self help resource (e.g., the user's question was not answered in the FAQ page, the chat bot was unable to solve the user's problem, etc.), or if a live agent is detected at block 1008 before the user indicates that the request is resolved, the method continues to block 1024.

At block 1024, it is determined whether the call center is affiliated with the system 100. For example, the call center may be configured for data connection with the data center 120 or user device 110. If the call center is affiliated, the method continues to block 1026, in which any further information obtained from the self help side process (block 1018-1022) is sent to the call center and/or a live agent that has answered or will answer the call center call. For example, the information sent to the call center can include options selected by the user in an online form, data the user has entered to the resource (e.g., a description of the user's question or problem), etc. Such information may be useful to live agent in determining how to assist the user and/or quickly and efficiently resolving the user's request without requiring the user to provide similar information repeatedly. After the information is sent to the call center, or if the call center is not affiliated with the system 100, the method 1000 continues to block 1006, where the call flow proceeds substantially as described with reference to FIG. 2. The call center call continues to be monitored until a live agent is detected at block 1008. When the live agent is detected, a user call can be initiated at block 1010 and bridged with the call center call at block 1012. When it is determined at block 1014 that the call has ended, the method 1000 terminates at block 1016 as the user call and the call center call are terminated.

EXAMPLES

In some embodiments, a networked resource corresponds to at least one of a frequently asked questions (FAQ) page and a customer service site.

In some embodiments, a multi-channel processing method further comprises determining, subsequent to the application navigating to the identified resource, that the user has resolved the request using the networked resource, and responsive to determining that the user has resolved the request, terminating the call center call.

In some embodiments, determining that the user has resolved the request comprises receiving, at a user interface of the communication device, an input from the user indicating that the request has been resolved.

In some embodiments, a method further comprises determining that a live agent has answered the call center call based at least in part on audio data received from the call center, determining that the user has not resolved the request using the networked resource, responsive to determining that the live agent has answered the call center call and the user has not resolved the request, causing initiation of a user call from the telephony service to the communication device, and causing the telephony service to bridge the user call and the call center call such that audio can be transmitted between the communication device and the call center.

In some embodiments, a method further comprises transmitting to the call center at least one item of information provided by the user at the networked resource.

Graphical User Interface

Figure 11B:
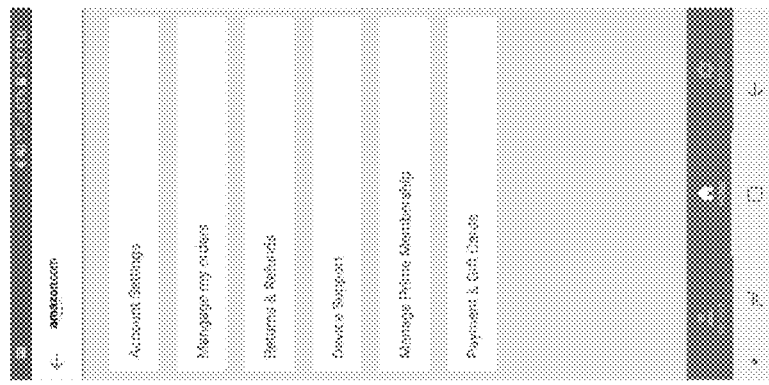
FIGS. 11A-11D depict example screens of an example graphical user interface for interacting with the communication systems and functionality described herein.
Figure 11A:
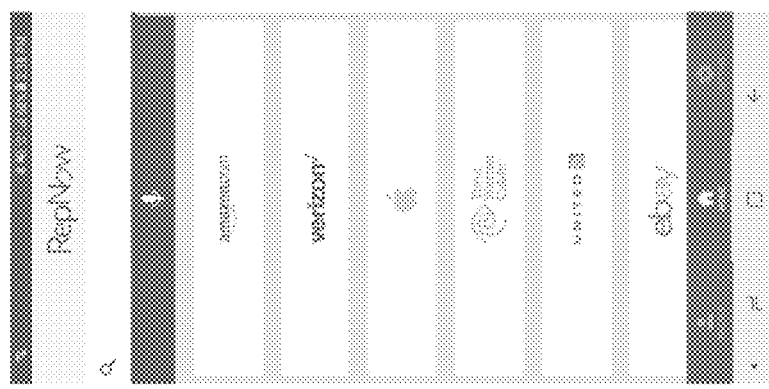
Figures 11C, 11D:
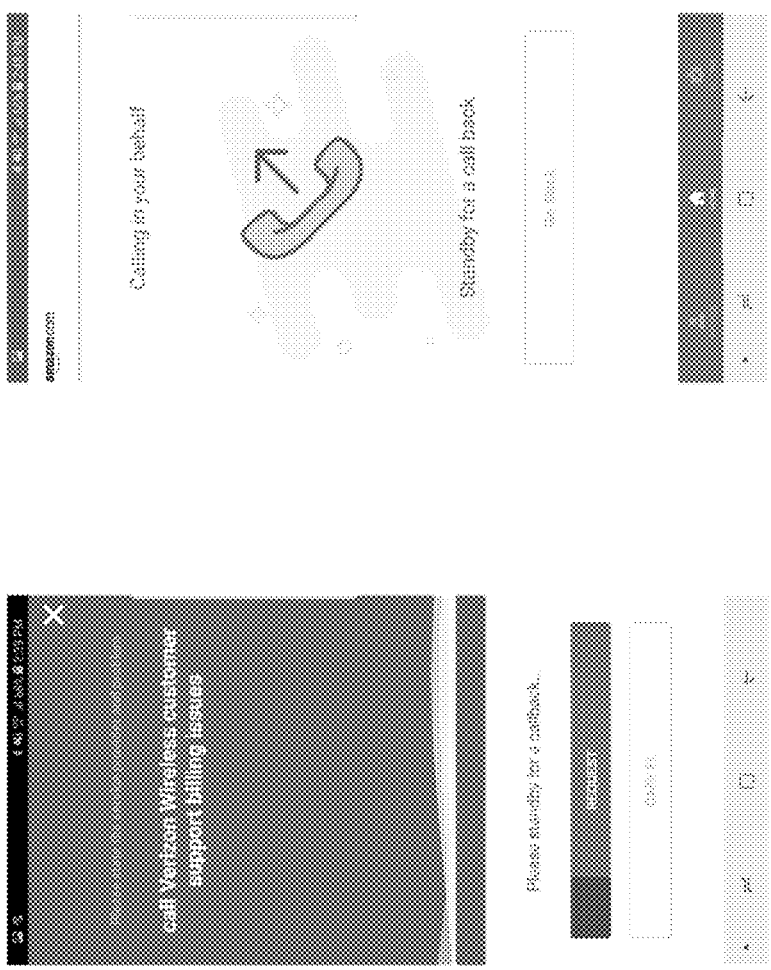

FIGS. 11A-11D depict screens of a graphical user interface (GUI) for interacting with any of the systems and/or methods described herein. For example, each of the screens depicted in FIGS. 11A-11D may be displayed on the display 170 of the user device 110 by the application 156. FIG. 11A depicts a home screen in which options are provided for various known service providers, as well as a text search option and a speech input option. FIG. 11B depicts a set of options for a type of service call to be requested for an individual service provider. FIG. 11C depicts an example of a visual representation of a natural language input as transcribed by one or more processors under control of the application. FIG. 11D depicts an example standby screen that may be displayed to a user, for example, while a call to the service provider is being placed (e.g., while an IVR system is being navigated, while the call center call is on hold and being monitored, etc.).

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A secure access control device (e.g. remote access server or monitoring device) can be or include a microprocessor, but in the alternative, the secure access control device can be or include a controller, microcontroller, or state machine, combinations of the same, or the like configured to authenticate and authorize remote access for delivery of an item. A secure access control device can include electrical circuitry configured to process computer-executable instructions. Although described herein primarily with respect to digital technology, a secure access control device may also include primarily analog components. For example, some or all of the access control algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a secure access control device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the secure access control device such that the secure access control device can read information from, and write information to, the storage medium. In the alternative, the storage medium can be integral to the secure access control device. The secure access control device and the storage medium can reside in an application specific integrated circuit (ASIC). The ASIC can reside in an access device or other secure access control device. In the alternative, the secure access control device and the storage medium can reside as discrete components in an access device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "a" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein, a "call" may encompass a wide variety of telecommunication connections between at least a first party and a second party. A call may additionally encompass a communication link created by a first party that has not yet been connected to any second party. A call may be a communication link between any combination of a user device (e.g., a telephone, smartphone, hand held computer, etc.), a VoIP provider, other data server, a call center including any automated call handling components thereof, or the like. A call may include connections via one or more of a public switched telephone network (PSTN), wired data connection, wireless internet connection (e.g., LTE, Wi-Fi, etc.), local area network (LAN), plain old telephone service (POTS), telephone exchanges, or the like.

As used herein, a "hold" or a "held call" can encompass a wide variety of pauses or suspensions in a call. A held call may be in a configuration in which a connection is maintained between two parties to a call. While a call is held, audio such as music, on hold messaging or other recorded audio may be transmitted to at least one party to the call. The party to which the audio is transmitted may be referred to as being "on hold."

As used herein, an "open call" refers to a call available to be transferred to a user. For example, an open call may be a call between a VoIP provider and a call center ready to be bridged with a user call.

As used herein, "bridging" refers to a variety of processes of combining two or more calls into a single call. For example, a call between a VoIP provider and a user device may be bridged with a call between the VoIP provider and a call center such that the user and an agent at the call center can exchange voice transmissions.

As used herein, "making," "placing," or "initiating" a call refers to a process of creating a call by one party to the call.

As used herein, "accepting" a call refers to a process that a user or the user's device can perform to allow voice transmission on both sides of the call.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A system comprising:
one or more client applications executable by respective communication devices, each communication device comprising one or more processors configured with processor-executable instructions included in the client application to perform operations comprising:
storing, via a communication device, user information for a user, wherein the user information includes at least one of generic user information and provider specific user information;
receiving, from the user of the communication device, a request associated with a service provider;
determining that the request is associated with at least one of the generic user information and the provider specific user information; and
transmitting, via a network, request information associated with the at least one of generic user information and provider specific user information; and
a server comprising one or more processors configured with processor-executable instructions to perform operations comprising:
receiving, via the network, the request information from the communication device;
causing, based at least in part on the request information, initiation of a call center call from a telephony service to a call center corresponding to the request;
determining that a live agent has answered the call center call;
responsive to determining that the live agent has answered the call center call, causing initiation of a user call from the telephony service to the communication device; and
causing the telephony service to bridge the user call and the call center call such that audio can be transmitted between the communication device and the call center.

2. The system of claim 1, wherein the one or more processors of the server are further configured with processor-executable instructions to perform operations comprising, before the live agent answers the call center call, navigating a call handling system of the call center by causing a response to be transmitted from the telephony service to the call center in response to an interactive voice response (IVR) prompt.

3. The system of claim 2, wherein the response is determined based at least in part on previously stored information associated with the call center, the previously stored information comprising at least one of a representation of the IVR prompt, a known sequence of IVR prompts, and a predetermined response.

4. The system of claim 2, wherein navigating the call handling system further comprises:
receiving the IVR prompt transmitted from the call center;
determining a data representation of at least a portion of the IVR prompt; and
determining, based on natural language processing, that the IVR prompt is a request for the response.

5. The system of claim 1, wherein the one or more processors of the server are further configured with processor-executable instructions to perform operations comprising:
detecting, subsequent to causing the telephony service to bridge the user call and the call center call, that the user has been placed on a hold;
transmitting a control message to suspend audio transmissions to the communication device;
detecting, subsequent to transmitting the control message, that a live agent has answered the call center call; and
transmitting a control message to resume audio transmissions to the communication device.

6. The system of claim 1, wherein the one or more processors of the server are further configured with processor-executable instructions to perform operations comprising:
detecting, subsequent to causing the telephony service to bridge the user call and the call center call, that the user call has been disconnected;
responsive to determining that the user call has been disconnected, causing initiation of a new call from the telephony service to the communication device to replace the disconnected user call; and
causing the telephony service to bridge the new call and the call center call such that audio can be transmitted between the communication device and the call center.

7. The system of claim 1, wherein the one or more processors of the server are further configured with processor-executable instructions to perform operations comprising causing the telephony service to transmit a proxy message to the live agent while the user call is initiated, the proxy message comprising an audio representation of a conversational response to the live agent.

8. The system of claim 7, wherein the proxy message is selected from a plurality of available proxy messages based at least in part on one or more words spoken by the live agent.

9. The system of claim 7, wherein the proxy message is further transmitted over the user call, and wherein the communication device is further configured to automatically answer the user call in a speaker mode such that at least a portion of the proxy message is played at the communication device in the speaker mode.

10. The system of claim 1, wherein the one or more processors of the server are further configured with processor-executable instructions to perform operations comprising:
determining, subsequent to causing the telephony service to bridge the user call and the call center call, that the call center call has been disconnected or placed on a hold; and
causing the telephony service to transmit a proxy message to the communication device.

11. The system of claim 1, wherein the call center call is initiated based at least in part on call center information retrieved from a data store remote from the communication device.

12. The system of claim 1, wherein the one or more processors of the server are further configured with processor-executable instructions to perform operations comprising:
detecting, subsequent to causing the telephony service to bridge the user call and the call center call, that the call center call has been disconnected;
responsive to determining that the call center call has been disconnected, causing the telephony service to terminate the user call;
causing initiation of a first new call from the telephony service to the call center;
determining that a live agent has answered the first new call;
responsive to determining that the live agent has answered the first new call, causing initiation of a second new call from the telephony service to the communication device; and
causing the telephony service to bridge the first new call and the second new call such that audio can be transmitted between the communication device and the call center.

13. The system of claim 1, wherein the one or more processors of the server are further configured with processor-executable instructions to perform operations comprising, responsive to receiving the request information from the communication device, determining that a pre-queued call center call corresponding to the request is not available, and wherein the call center call is initiated based at least in part on the determination that a pre-queued call center call corresponding to the request is not available.

14. The system of claim 13, wherein determining that a pre-queued call center call corresponding to the request is not available comprises determining that one or more existing pre-queued call center calls corresponding to the call center are not available for the request based on at least one of a priority status of the user, an elapsed time since the request was submitted, and a subdivision of the call center associated with the one or more existing pre-queued call center calls.

15. The system of claim 1, wherein the request comprises a natural language input, and wherein the request information comprises a representation of the natural language input.

16. The system of claim 15, wherein causing initiation of the call center call comprises determining, using natural language processing, a phone number of the call center corresponding to the request.

17. The system of claim 1, wherein the request comprises a natural language input, and wherein determining that the request is associated with at least one of the generic user information and the provider specific user information comprises using natural language processing.

18. The system of claim 1, wherein the call center call is associated with a post-call interactive voice response (IVR) survey comprising an IVR prompt, and wherein the one or more processors of the server are further configured with processor-executable instructions to perform operations comprising:
  detecting, subsequent to causing the telephony service to bridge the user call and the call center call, an end of an interaction between the user and the live agent;
  causing, at least in part, transmission to the communication device of a visual representation of the IVR prompt;
  causing, at least in part, the IVR prompt to be displayed on a display of the communication device;
  receiving, from the communication device, a response to the IVR prompt; and
  transmitting the response to the call center.

19. The system of claim 18, wherein causing, at least in part, transmission to the communication device of a visual representation of the IVR prompt comprises:
  receiving an audio representation of the IVR prompt;
  processing the audio representation to produce a visual representation of the IVR prompt; and
  transmitting the visual representation to the communication device.

20. The system of claim 19, wherein transmitting the response to the call center comprises generating an audio representation of the response and transmitting the audio representation to the call center as a response to the audio representation of the IVR prompt.

21. The system of claim 18, wherein causing, at least in part, transmission to the communication device of the visual representation of the IVR prompt comprises:
  receiving, via a data connection with the call center, a visual representation of the IVR prompt;
  receiving, via the data connection with the call center, an identifier associated with the call center call; and
  transmitting the visual representation to the communication device.

22. The system of claim 21, wherein transmitting the response to the call center comprises:
  associating the response with the call center call based at least in part on an identifier for the communication device received with the response; and
  transmitting, via the data connection with the call center, a representation of the response and the identifier.

23. The system of claim 1, wherein the one or more processors of the communication device are further configured with processor-executable instructions included in the client application to perform operations comprising, responsive to the initiation of the user call to the communication device, automatically answering the user call in a speaker mode.

24. The system of claim 23, wherein the one or more processors of the communication device are further configured with processor-executable instructions included in the client application to perform operations comprising:
  determining, based on an output of one or more sensors of the communication device, that the communication device has been picked up subsequent to answering the user call; and
  responsive to determining that the communication device has been picked up, cause the communication device to transition to a handset mode such that the communication device plays audio transmissions from the call center at a lower volume relative to the speaker mode.

25. The system of claim 24, wherein the one or more sensors of the communication device comprise at least one of an accelerometer, a proximity sensor, a photodetector, and a microphone.

26. The system of claim 1, wherein the one or more processors of the communication device are further configured with processor-executable instructions included in the client application to perform operations comprising automatically dismissing incoming calls that are not the user call between a time when the request information is transmitted and a time when the user call is answered.

27. The system of claim 1, wherein the one or more processors of the server are further configured with processor-executable instructions to perform operations comprising:
  receiving an audio transmission from the call center while the call center call is on hold at the call center;
  determining, based on natural language processing, that the audio transmission identifies a networked resource associated with the request; and
  causing, at least in part, an application being executed on the communication device to present at least a portion of the networked resource.

28. The system of claim 27, wherein the networked resource corresponds to at least one of a frequently asked questions (FAQ) page and a customer service site.

29. The system of claim 27, wherein the one or more processors of the server are further configured with processor-executable instructions to perform operations comprising determining that the user has not resolved the request using the networked resource, and wherein the user call is initiated based at least in part on determining that the live agent has answered the call center call and that the user has not resolved the request.

30. The system of claim 29, further comprising transmitting, to the call center, at least one item of information provided by the user at the networked resource.

* * * * *